Inventor.
Morris Cohen
By: Louis A. Kline
John T. Matlago
Richard J. Seigel
His Attorneys.

Jan. 17, 1967 M. COHEN 3,299,260

PARALLEL ADDER USING MAJORITY DECISION ELEMENTS

Filed Aug. 6, 1963 14 Sheets-Sheet 2

Inventor.
Morris Cohen
By: Louis A Kline
John J. Marlago
Richard J. ...
His Attorneys.

PARALLEL ADDER USING MAJORITY DECISION ELEMENTS

Filed Aug. 6, 1963 14 Sheets-Sheet 3

Inventor
Morris Cohen

By: Louis A. Kline, John J. Matlago, Richard J. Kessler

Attorneys.

Fig. 2c

| | Decimal | Binary-Coded Decimal | | | Carry Propagation |
|---|---|---|---|---|---|
| Adder Stages | #3 #2 #1 | #3 (8-4-2-1) | #2 (8-4-2-1) | #1 (8-4-2-1) | #3 #2 #1 |
| Augend | 3 6 7 | 0011 (c) | 0110 (b) | 0111 (a) | |
| Addend | 4 3 5 | 0100 (f) | 0011 (e) | 0101 (d) | Sum≥9 0(R9c) 1(R9b) 1(R9a) |
| Partial Sum(Sp) | 7 9 2 | 0111 (Sp3) | 1001 (Sp2) | 0010 (Sp1) | Sum≥10 0(R9c) 0(R10b) 1(R10a) |
| Carry(K) | (1) (1) (0) | (1)(K3) | (1)(K2) | (0)(K1) | (0)←(1)←(1)←(0)← |
| Sum (S) | 8 0 2 | 1000(S3) | 0000(S2) | 0010(S1) | K4 K3 K2 K1 |

Fig. 4a

-TABLE 1-

| Decimal Equivalent | Binary-Coded Decimal (Adder Inputs) $2^3$ | $2^2$ | $2^1$ | $2^0$ |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

-TABLE 2-

| Decimal Equivalent | Binary-Coded Decimal: Partial Sum Outputs (Mod 10) | | | | Carry Outputs | |
|---|---|---|---|---|---|---|
| | Sp8a | Sp4a | Sp2a | Sp1a | R10a | R9a |
| Sp1 | $2^3$ | $2^2$ | $2^1$ | $2^0$ | ≥10 | ≥9 |
| 0 | 0 | 0 | 0 | 0 | 0 | 0 |
| 1 | 0 | 0 | 0 | 1 | 0 | 0 |
| 2 | 0 | 0 | 1 | 0 | 0 | 0 |
| 3 | 0 | 0 | 1 | 1 | 0 | 0 |
| 4 | 0 | 1 | 0 | 0 | 0 | 0 |
| 5 | 0 | 1 | 0 | 1 | 0 | 0 |
| 6 | 0 | 1 | 1 | 0 | 0 | 0 |
| 7 | 0 | 1 | 1 | 1 | 0 | 0 |
| 8 | 1 | 0 | 0 | 0 | 0 | 0 |
| 9 | 1 | 0 | 0 | 1 | 0 | 1 |
| 10 | 0 | 0 | 0 | 0 | 1 | 1 |
| 11 | 0 | 0 | 0 | 1 | 1 | 1 |
| 12 | 0 | 0 | 1 | 0 | 1 | 1 |
| 13 | 0 | 0 | 1 | 1 | 1 | 1 |
| 14 | 0 | 1 | 0 | 0 | 1 | 1 |
| 15 | 0 | 1 | 0 | 1 | 1 | 1 |
| 16 | 0 | 1 | 1 | 0 | 1 | 1 |
| 17 | 0 | 1 | 1 | 1 | 1 | 1 |
| 18 | 1 | 0 | 0 | 0 | 1 | 1 |

Inventor.
Morris Cohen
By: Louis A. Kline
John J. Matlago
Richard T. Regal
His Attorneys.

Fig. 4b

–TABLE 3–
(For Partial Adder Circuit 30)
($2^0$)

| Adder Inputs | | States of Majority Decision Elements (Sp1a) | | | |
|---|---|---|---|---|---|
| a1 | d1 | P01 | P02 | P01a | P01b |
| (Augend) 0 | (Addend) 0 | | | | |
| 1 | 0 | 1 | | 1 | 1 |
| 0 | 1 | 1 | | 1 | 1 |
| 1 | 1 | 1 | 1 | | |

Fig. 4e

–TABLE 6–
(For Partial Adder Circuit 36)
($2^3$)

| Partial Sums (Decimal) | Adder Inputs | | States of Majority Decision Elements (Sp8a) | | | | | | | | | | |
|---|---|---|---|---|---|---|---|---|---|---|---|---|---|
| | a8 a4 a2 a1 | d8 d4 d2 d1 | P12 | P31 | P32 | P13 | P27 | P02 | P30a | P31a | P32a | P33a | P30b |
| 8 | (Augend) 0 1 1 1 | (Addend) 0 0 0 1 | 1 | 1 | | | | 1 | 1 | | | | 1 |
| 8 | 0 0 1 1 | 0 1 0 1 | | | 1 | | | 1 | 1 | | | | 1 |
| 8 | 0 1 1 0 | 0 0 1 0 | 1 | 1 | | | | | 1 | | | | 1 |
| 8 | 0 0 1 0 | 0 1 1 0 | | | 1 | | | | 1 | | | | 1 |
| 8 | 0 1 0 0 | 0 1 0 0 | | 1 | 1 | | | | 1 | | | | 1 |
| 8 | 1 0 0 0 | 0 0 0 0 | | | | 1 | | | | 1 | | | 1 |
| 9 | 0 1 1 1 | 0 0 1 0 | 1 | 1 | | | | | 1 | | | | 1 |
| 9 | 0 0 1 1 | 0 1 1 0 | | | 1 | | | | 1 | | | | 1 |
| 9 | 0 1 0 1 | 0 1 0 0 | | 1 | 1 | | | | 1 | | | | 1 |
| 9 | 1 0 0 1 | 0 0 0 0 | | | | 1 | | | | 1 | | | 1 |
| 18 | 1 0 0 1 | 1 0 0 1 | | | | 1 | 1 | 1 | | 1 | 1 | 1 | 1 |

Inventor.
Morris Cohen
By: Louis A. Kline
John J. Matlago
Richard J. Rengel
His Attorneys.

Fig. 4c

–TABLE 4–

(For Partial Adder Circuit 32)
($2^1$)

| Partial Sums (Decimal) | Adder Inputs: a8 a4 a2 a1 (Augend) | Adder Inputs: d8 d4 d2 d1 (Addend) | P10 | P11 | P12 | P13 | P14 | P15 | P16 | P02 | P18 | P10a | P11a | P12a | P13a | (Sp2a) P10b |
|---|---|---|---|---|---|---|---|---|---|---|---|---|---|---|---|---|
| 2 | 0 0 0 1 | 0 0 0 1 | 1 | | | | | | | 1 | | 1 | | 1 | | 1 |
| 2 | 0 0 1 0 | 0 0 0 0 | | 1 | | | | | 1 | | | 1 | 1 | | | 1 |
| 2 | 0 0 0 0 | 0 0 1 0 | 1 | | | | | | 1 | | | 1 | 1 | | | 1 |
| 3 | 0 0 1 1 | 0 0 0 0 | | 1 | | | | | 1 | | | 1 | 1 | | | 1 |
| 3 | 0 0 0 0 | 0 0 1 1 | 1 | | | | | | 1 | | | 1 | 1 | | | 1 |
| 6 | 0 0 1 1 | 0 0 1 1 | 1 | 1 | 1 | | | | 1 | 1 | | 1 | | | | 1 |
| 6 | 0 1 0 1 | 0 0 0 1 | 1 | | | | | 1 | | 1 | | | | 1 | | 1 |
| 6 | 0 1 1 0 | 0 0 0 0 | | 1 | | | | 1 | 1 | | | | 1 | | | 1 |
| 6 | 0 0 0 0 | 0 1 1 0 | 1 | | | | | 1 | 1 | | | | 1 | | | 1 |
| 7 | 0 1 1 1 | 0 0 0 0 | | 1 | | | | 1 | 1 | | | | 1 | | | 1 |
| 7 | 0 1 0 1 | 0 0 1 0 | 1 | | | | | 1 | 1 | | | | 1 | | | 1 |
| 12 | 0 1 1 1 | 0 1 0 1 | | 1 | 1 | | 1 | 1 | 1 | 1 | | | | | 1 | 1 |
| 12 | 0 1 0 1 | 0 1 1 1 | 1 | | 1 | | 1 | 1 | 1 | 1 | | | | | 1 | 1 |
| 12 | 0 1 1 0 | 0 1 1 0 | | 1 | 1 | | 1 | 1 | 1 | | | | | | 1 | 1 |
| 12 | 1 0 0 1 | 0 0 1 1 | | 1 | 1 | 1 | | | 1 | 1 | | | | | 1 | 1 |
| 12 | 0 0 1 1 | 1 0 0 1 | | 1 | 1 | 1 | | | 1 | 1 | | | | | 1 | 1 |
| 12 | 1 0 0 1 | 0 0 1 1 | 1 | | 1 | 1 | | | 1 | 1 | | | | | 1 | 1 |
| 12 | 1 0 0 0 | 0 1 0 0 | | | | 1 | | 1 | | | 1 | | | | 1 | 1 |
| 13 | 0 1 1 1 | 0 1 1 0 | | 1 | 1 | | 1 | 1 | 1 | | | | | | 1 | 1 |
| 13 | 1 0 0 1 | 0 1 0 0 | | | | 1 | | 1 | | | 1 | | | | 1 | 1 |
| 16 | 1 0 0 1 | 0 1 1 1 | | 1 | 1 | 1 | | 1 | 1 | 1 | 1 | | | | 1 | 1 |
| 16 | 0 1 1 1 | 1 0 0 1 | 1 | | 1 | 1 | | 1 | 1 | 1 | 1 | | | | 1 | 1 |
| 16 | 1 0 0 0 | 1 0 0 0 | | | | 1 | | | | | 1 | | | | 1 | 1 |
| 17 | 1 0 0 1 | 1 0 0 0 | | | | 1 | | | | | 1 | | | | 1 | 1 |

Inventor.
Morris Cohen
By: Louis A. Kline
John T. Matlago
Richard T. Lengel
His Attorneys.

Fig. 4d

—TABLE 5—

(For Partial Adder Circuit 34)

$(2^2)$

| Partial Sums (Decimal) | Adder Inputs | | | | | | | | States of Majority Decision Elements | | | | | | | | | | | | | | |
|---|---|---|---|---|---|---|---|---|---|---|---|---|---|---|---|---|---|---|---|---|---|---|---|
| | a8 | a4 | a2 | a1 | d8 | d4 | d2 | d1 | P20 | P21 | P02 | P16 | P24 | P15 | P13 | P27 | P12 | P14 | P20a | P21a | P22a | P23a (Sp4a) | P20b |
| | (Augend) | | | | (Addend) | | | | | | | | | | | | | | | | | | |
| 4 | 0 | 0 | 1 | 1 | 0 | 0 | 0 | 1 | | | 1 | 1 | | | | | 1 | | | | 1 | | 1 |
| 4 | 0 | 0 | 1 | 0 | 0 | 0 | 1 | 0 | | | | 1 | | | | | 1 | | | | 1 | | 1 |
| 4 | 0 | 1 | 0 | 0 | 0 | 0 | 0 | 0 | | | | | | 1 | | | | | | | | 1 | 1 |
| 5 | 0 | 0 | 1 | 1 | 0 | 0 | 1 | 0 | | | | 1 | | | | | 1 | | | | 1 | | 1 |
| 5 | 0 | 1 | 0 | 1 | 0 | 0 | 0 | 0 | | | | | | 1 | | | | | | | | 1 | 1 |
| 6 | 0 | 0 | 1 | 1 | 0 | 0 | 1 | 1 | | | 1 | 1 | | | | | 1 | | | | 1 | | 1 |
| 6 | 0 | 1 | 0 | 1 | 0 | 0 | 0 | 1 | | | 1 | | | 1 | | | | | | | | 1 | 1 |
| 6 | 0 | 1 | 1 | 0 | 0 | 0 | 0 | 0 | | | | 1 | | 1 | | | | | | | | 1 | 1 |
| 7 | 0 | 1 | 1 | 1 | 0 | 0 | 0 | 0 | | | | 1 | | 1 | | | | | | | | 1 | 1 |
| 14 | 0 | 1 | 1 | 1 | 0 | 1 | 1 | 1 | | | 1 | 1 | 1 | 1 | | | 1 | | 1 | | | | 1 |
| 14 | 1 | 0 | 0 | 1 | 0 | 1 | 0 | 1 | 1 | | 1 | | | 1 | 1 | | | | 1 | | | | 1 |
| 14 | 0 | 1 | 0 | 1 | 1 | 0 | 0 | 1 | | 1 | 1 | | | 1 | 1 | | | | 1 | | | | 1 |
| 14 | 1 | 0 | 0 | 0 | 0 | 1 | 1 | 0 | 1 | | | 1 | | 1 | 1 | | | | 1 | | | | 1 |
| 14 | 0 | 1 | 1 | 0 | 1 | 0 | 0 | 0 | | 1 | | 1 | | 1 | 1 | | | | 1 | | | | 1 |
| 15 | 1 | 0 | 0 | 1 | 0 | 1 | 1 | 0 | 1 | | | 1 | | 1 | 1 | | | | 1 | | | | 1 |
| 15 | 0 | 1 | 1 | 0 | 1 | 0 | 0 | 1 | | 1 | | 1 | | 1 | 1 | | | | 1 | | | | 1 |
| 16 | 1 | 0 | 0 | 1 | 0 | 1 | 1 | 1 | 1 | | 1 | 1 | | 1 | 1 | | 1 | | 1 | | | | 1 |
| 16 | 0 | 1 | 1 | 1 | 1 | 0 | 0 | 1 | | 1 | 1 | 1 | | 1 | 1 | | 1 | | 1 | | | | 1 |
| 16 | 1 | 0 | 0 | 0 | 1 | 0 | 0 | 0 | | | | | | | 1 | | | | | 1 | | | 1 |
| 17 | 1 | 0 | 0 | 1 | 1 | 0 | 0 | 0 | | | | | | | 1 | 1 | | | | 1 | | | 1 |

Inventor.
Morris Cohen
By: Louis A Kline
John T. Matlago
Richard T. Engel
His Attorneys.

Inventor.
Morris Cohen
By: Louis A. Kline
John J. Matlago
Richard L. [illegible]
His Attorneys.

Inventor.
Morris Cohen
By: Louis A. Kline
John T. Matlago
Richard T. Seeger
His Attorneys.

Inventor.
Morris Cohen
By: Louis A. Kline
John J. Maclago
Richard [illegible]
His Attorneys.

PARALLEL ADDER USING MAJORITY DECISION ELEMENTS

Inventor
Morris Cohen
By: [signatures]
His Attorneys.

Inventor.
Morris Cohen
By: Loris A. Klein
John J. Matlago
Richard L. [illegible]
His Attorneys.

PARALLEL ADDER USING MAJORITY DECISION ELEMENTS

Inventor.
Morris Cohen
By: Louis A. Kline
John J. Matlago
Richard T. [signature]
His Attorneys.

Inventor.
Morris Cohen
By: Louis A. Kline
John J. Matlago
Richard T. Laughlin
His Attorneys.

United States Patent Office 3,299,260

Patented Jan. 17, 1967

3,299,260

PARALLEL ADDER USING MAJORITY DECISION ELEMENTS

Morris Cohen, Los Angeles, Calif., assignor to The National Cash Register Company, Dayton, Ohio, a corporation of Maryland Filed Aug. 6, 1963, Ser. No. 300,202
18 Claims. (Cl. 235—173)

The present invention is directed to computer circuits for performing logical operations and, more particularly, to electronic digital circuitry for performing logical operations for processing data.

According to the preferred embodiment of the present invention, networks of majority decision elements or devices are provided for performing the function of adding numbers which are expressed in binary-coded decimal form, i.e., each decimal digit is represented by a combination of binary digits "1" and "0." Each of the majority decision elements is provided with a plurality of inputs and is capable of assuming either a binary "1" or a binary "0" operating output state according to whichever one of the binary signals "1" or "0" is predominant at the inputs thereof. In the preferred arrangement of the present invention, the majority decision elements comprise magnetic thin film parametric elements of the type disclosed in detail in a copending application of Bruce A. Kaufman entitled Parametrical Device, and Apparatus, Ser. No. 43,801, filed on July 19, 1960, and an article entitled On the Characteristics of Cylindrical Thin Film Parametrons Pumped to Saturation, published in the May 1963 Proceedings of the IEEE. It has been found that the reliability of each of these thin film parametric elements is such as to be capable of accepting as many as seven binary signal inputs and of assuming either one of the operating binary states "0" or "1" to produce an output corresponding to the majority of these binary inputs.

The majority decision principle which is employed to the best advantage in the present invention enables a single seven input majority decision computer element to represent a fairly complex function (majority decision function) such that a network of these elements for performing a given logical operation, e.g., addition, can be realized with less components and less logical levels than networks employing majority decision elements limited to a fewer number of inputs or networks employing other more conventional components such as diodes and transistors. Thus, although the time required for operation of networks formed of known majority decision elements is generally of longer duration than the operation of networks formed of other more conventional components, such as high speed transistor and diode logical circuits, the realization of more complex functions by a single majority decision element is important in providing overall higher speed of operation of adder circuitry and other similar electronic digital logical devices.

Briefly, the present invention, as disclosed hereinafter by a preferred embodiment thereof, is directed to an adder for operating in a parallel fashion on a pair of numbers expressed by binary-coded decimal digits to produce the sum thereof. This adder comprises a plurality of adder stages (the prefered embodiment has twelve stages) wherein an adder stage is provided for each order of numerical value of the decimal numbers whose sum is desired. Each adder stage comprises a decimal unit for performing partial binary addition, a carry digit propagation circuit and a carry digit incorporation circuit. The combination of adder stages provides for parallel summing of the multiple digit numbers applied to the inputs of the adder. Each of the partial binary adder units comprises four parallel binary adder circuits (one for each of the four binary bit positions $2^0$, $2^1$, $2^2$ and $2^3$) for directly producing binary-coded decimal partial sum signals for each of the corresponding pairs of binary-coded decimal digits of the numbers applied to the inputs thereof and a carry detector circuit for producing carry digit signals. These carry digit signals are applied to the carry propagation circuits to provide for propagation of the carry digit signals from lower order decimal adder stages to higher order adder stages in order to distribute carry digit signals to the higher order stages of the carry incorporation circuits to enable the sum to be formed at the adder output in a minimum time interval.

One of the novel features of the partial adder circuits of the present invention is the provision of binary-coded decimal output signals in each adder stage representing the partial sum (mod 10) of a pair of decimal digits of the same order, without the need of decimal correction, even when the partial sum is ten (10) or more. The term "partial sum (mod 10)," as used herein, designates a sum that does not take into account carry digits and thus does not exceed nine (i.e., 0 to 9, incl.); and (mod 10) is the commonly known abbreviation of "modulo 10."

Another feature of the present invention, which enables a reduction in the number of logical levels to obtain a final sum, is provided by the carry digit detector circuit. The carry detector circuit for each adder stage detects a partial sum equal to or greater than nine ($\geqq 9$) to produce a carry propagation signal, and also detects a partial sum equal to or greater than ten ($\geqq 10$) to produce a true carry digit signal which is referred to hereinafter as a carry digit originating signal. Both the carry digit propagation signal and the carry digit originating signal are initiated immediately, prior to the complete production of the partial sum (mod 10) signals, to enable the carry digit signals to more rapidly reach each of the decimal stages and to be accounted for, in forming the final sum, thereby decreasing the number of levels of logic and the time required to obtain the sum of the numbers being added. A carry digit originating signal will always generate an interstage carry digit signal (K) for the next higher order adder stage of the carry incorporation circuits. A carry digit propagation signal will only generate an interstage carry digit signal (K) for the next higher order stage of the carry digit incorporation circuit when the next lower adder stage generates an interstage carry digit signal K. The carry digit signals generated in the carry digit propagation circuit are combined with the partial sum (mod 10) signals to provide the true sum, including the carry digits, in a manner to be disclosed more fully hereinafter in the detailed description of the present invention.

Accordingly, it is an object of the present invention to provide a novel, fast acting, parallel operated digital adder having the foregoing features and advantages.

Another object of the present invention is the provision of an adder for summing binary-coded decimal digits in parallel in which the logical functions are performed by majority decision elements.

A further object of the present invention is to provide for the addition of digits in which the logical functions involved in the addition are performed by magnetic thin film parametric elements operating as majority decision elements.

Still another object of the present invention is to provide a digital adder in which the logical functions are performed by majority decision elements having as many as seven binary signal control inputs and in which a majority of the inputs of one of the majority elements, or the equivalent thereof, controls the operating state of the majority element.

A further object of the present invention is the provision of a twelve stage binary-coded decimal digit adder which produces the complete sum of two twelve decimal digit numbers during an overall operating period involving six logical levels.

Another object of the present invention is to provide a novel arrangement of majority decision elements for propagation and generation of carry digit signals.

A still further object of the present invention is the provision of carry digit propagation circuits that utilize redundant carry information to simplify the circuitry involved and minimize the number of logical levels required to propagate carry digit signals from lower order adder stages to higher order adder stages.

Other objects and features of the invention will become apparent to those skilled in the art as the disclosure is made in the following detailed description of a preferred embodiment of the invention as illustrated in the accompanying sheets of drawings in which:

FIG. 1 is a block diagram showing a parallel, binary-coded decimal adder and also a timing clock source for supplying timing signals thereto, for illustrating the general arrangement of the preferred embodiment of the adder of the present invention;

FIG. 2*a* is a more detailed block diagram of three adder stages of the adder shown in FIG. 1, for illustrating the operation of adding typical binary-coded decimal digits of the augend and addend in parallel fashion;

FIG. 2*b* is a diagram showing the timing signals for controlling the operation of the parallel, binary-coded decimal digit adder shown in FIGS. 1 and 2*a*;

FIG. 2*c* illustrates an example of the operation of addition as performed on binary-coded decimal digits by the three adder stages of the parallel, decimal adder shown in FIG. 2*a*;

FIG. 3 is a block diagram of adder stage #1 of the adder shown in FIGS. 1 and 2*a* and is typical of the adder stages of the adder of the preferred embodiment;

FIG. 4*a* shows the binary system of representing decimal digits of the adder inputs in Table 1 and partial sums (mod 10) in the same binary system in Table 2;

FIG. 4*b* shows Table 3 which sets forth the binary "1" states only of majority decision elements of the partial adder circuit ($2^0$) in response to combinations of the lowest order binary-coded decimal digit signals of the augend and addend;

FIGS. 4*c*, 4*d* and 4*e* show Tables 4, 5, and 6, respectively, which set forth the binary "1" states only of majority elements of the respective partial adder circuits ($2^1$, $2^2$ and $2^3$) in response to typical binary-coded decimal digit signals representing partial sums requiring binary "1" signals on the outputs of the respective circuits;

FIG. 5*a* is a schematic illustration of a typical majority decision element wherein the majority decision functions performed by this element are illustrated by Boolean equations;

FIGS. 5*b* and 5*c* are equivalent schematic diagrams of the same typical portion of the network of majority decision elements of the partial adder circuits ($2^1$) shown in FIG. 7, and are shown here only for the purpose of clarification of the diagrammatic illustrations of the networks of majority decision elements in the remainder of the drawings showing the adder of the present invention;

FIG. 6 is a schematic diagram of the partial adder circuit ($2^0$) of the adder stage #1, shown in block diagram in FIG. 3, which is operative to provide a binary-coded decimal partial sum (mod 10) of the least significant digits of the augend and addend, and this circuit is typical of partial adder circuits ($2^0$) of the other adder stages of the adder of the preferred embodiment of the invention;

FIGS. 7, 8 and 9 are schematic diagrams of the other partial adder circuits ($2^1$, $2^2$ and $2^3$), respectively, of adder stage #1, shown in block diagram in FIG. 3, and these circuits are typical of respective partial adder circuits ($2^1$, $2^2$ and $2^3$) of the other adder stages of the adder of the preferred embodiment of the invention;

FIG. 10 is a schematic diagram of the carry detector circuit of adder stage #1, shown in block diagram in FIG. 3, for producing carry signals indicating a partial sum of the least significant digits as equal to or greater than ten (≧10) and/or equal to or greater than nine (≧9) and this circuit is typical of the carry detector circuits of the adder stages of the adder of the preferred embodiment of the invention;

FIGS. 11*a* and 11*b* comprise a schematic diagram of all the carry propagation circuits for all twelve adder stages (#1 to #12, incl.), which circuits provide for propagating carry digit signals from lower order adder stages to higher order adder stages of the twelve stage adder illustrated by the block diagram in FIG. 1;

FIG. 12 is a schematic diagram of the carry incorporation circuit for the adder stage #1 which provides for combining the partial sum (mod 10) and carry digit signals to produce the sum for adder stage #1; and this circuit, as shown, is typical of the carry incorporation circuits of the lower order adder stages providing for a single carry digit signal input;

FIG. 13*a* is a schematic diagram of the carry incorporation circuit for adder stage #10 and this circuit is typical of corresponding carry incorporation circuits for the higher adder stages providing for three carry digit signals;

FIGS. 13*b* and 13*c* show the input lines and terminals only for carry incorporation circuits for adder stages #11 and #12 providing for three carry signals;

FIG. 14 is a schematic diagram of a serial, decimal adder circuit ($2^0$) of the first alternate embodiment of the present invention which has provision for a carry signals input to provide for serial operation in the addition of numbers;

FIG. 15*a* is a schematic diagram showing the binary partial adder circuits and binary carry incorporation circuits of adder stage #1 of the second alternate embodiment of the binary parallel adder of the present invention which provides for addition of numbers represented in pure binary notation;

FIG. 15*b* is a schematic diagram showing the binary carry detector circuit of adder stage #1 of the second alternate embodiment of FIG. 15*a*; and FIG. 15*c* is a schematic diagram of carry incorporation circuit for adder stage #10 of the second alternate embodiment which provides for incorporation of three binary carry digit signals.

GENERAL DESCRIPTION (FIG. 1)

Referring now to the drawings, wherein like reference characters designate like or corresponding parts throughout the several views, FIG. 1 shows the parallel, majority logic adder 20 which compromises the preferred embodiment of the present invention. The adder 20 accepts binary-coded decimal digit signals at its augend and addend inputs, and operates to produce a sum expressed by binary-coded decimal digit signals at its sum output. The binary-coded decimal digit signals representing the augend and addend are applied to inputs of the adder 20 simultaneously, i.e., in parallel, and the decimal units 22 operate to produce partial sums (mod 10) and carry signals. Carry propagation circuits 24 have carry digit signal inputs coupled to the decimal units 22 and provide for propagation of the carry signals from the lower order to higher order adder stages of carry incorporation circuits 26 where the partial sum outputs of the decimal units 22 are modified to include the carry signals to produce the sum at the sum output.

The adder 20 shown in FIG. 1 comprises networks of majority decision elements and preferably of parametric elements, such as P10, P10*a*, P13*a* and P10*b*, for example as shown in FIGS. 5*b* and 5*c*, which elements are supplied high frequency timing signals designated subclocks I, II and III from a clock source 28 for timing their operation. The subclocks I, II and III are generated by the clock source 28 to provide for synchronous operation of the adder 20 at a desired clock repetition rate, e.g., 200 kilocycles. At this clock rate, an operating cycle of the majority decision elements in adder 20 has a time period of 5 microseconds, as illustrated by the timing diagram of FIG. 2*b*. The clock source 28 may comprise, for example, a sinusoidal signal wave generator producing a 20 megacycle signal (2*f*) which is modulated at the clock rate to produce overlapping subclock signals, I, II and III in any known manner, e.g., as disclosed in the previously cited copending application. As shown by the timing diagram of FIG. 2*b*, an "addition" time period, *t*0 to *t*6, which is the period of time required to provide the sum of the augend and the addend, includes two successive operating cycles No. 1 and No. 2 of overlapping subclock signals I, II and III. Since cycles No. 1 and No. 2 are identical repetitive cycles, a new augend and a new addend can be applied to the adder every subclock I time so that operations involving two independent sets of augend and addend can be performed in the adder 20 at the same time. However, to simplify the description which follows, the operation herein is described in connection with the addition of the exemplary augend (367) and addend (435) applied to the adder inputs as shown in FIG. 2*a*. Accordingly, decimal units 22 (FIG. 1) are described as being operative in the first operating cycle No. 1, including subclocks I, II and III, to produce the partial sums (mod 10) and carry signals, and the carry incorporation circuits 26 are described as being operative in the second operating cycle No. 2 to produce the sum at the sum output at the end of the addition time period. Carry propagation circuits are operative during subclock III of operating cycle No. 1 and subclock I of operating cycle No. 2. During the time interval of these latter subclocks III and I, sufficient time is provided to propagate the carry signals from the lower order adder stages to the higher order adder stages.

In the drawings and detailed description of the present invention, certain letters and numbers have been grouped to provide reference characters which designate particular circuits, inputs, outputs or parts of the adder 20. In accordance therewith, small letters *a, b,* and *c,* have been included in reference characters designating the augend binary digit inputs of respective adder stages #1, #2 and #3; and corresponding small letters *a, b* and *c* have been included in reference characters designating partial sum (mod 10) signal outputs, carry digit signal outputs and sum outputs of respective adder stages #1, #2 and #3. For example, in FIG. 2*a*, reference characters for adder stage #1 include reference characters *a*1, *a*2, *a*4 and *a*8 to refer to respective ones of four inputs for a set of four binary-coded decimal digit signals representing the least significant decimal digit of the augend; reference characters R9*a* and R10*a* to refer to carry digit signal outputs; reference characters S*p*1*a*, S*p*2*a*, S*p*4*a* and S*p*8*a* to refer to respective ones of four partial sum (mod 10) outputs; and reference characters S1*a*, S2*a*, S4*a* and S8*a* to refer to respective ones of four sum outputs. A partial sum (mod 10) is referred to by the letters S*p* which are followed by a digit designating the stage, e.g., S*p*1 is the partial sum (mod 10) of stage #1. Similarly, carry signal outputs K1, K2 and K3 of the carry propagation circuits are provided for interstage carry signals applied to carry incorporation circuits for adder stages #1, #2 and #3, respectively. As to reference characters for adder inputs for binary-coded decimal signals representing the addend, small letters *d, e,* and *f* have been employed, as shown in FIG. 2*a*, to refer to adder inputs for adder stages #1, #2 and #3, respectively.

DETAILED DESCRIPTION (FIG. 2*a*)

Figure 2A:
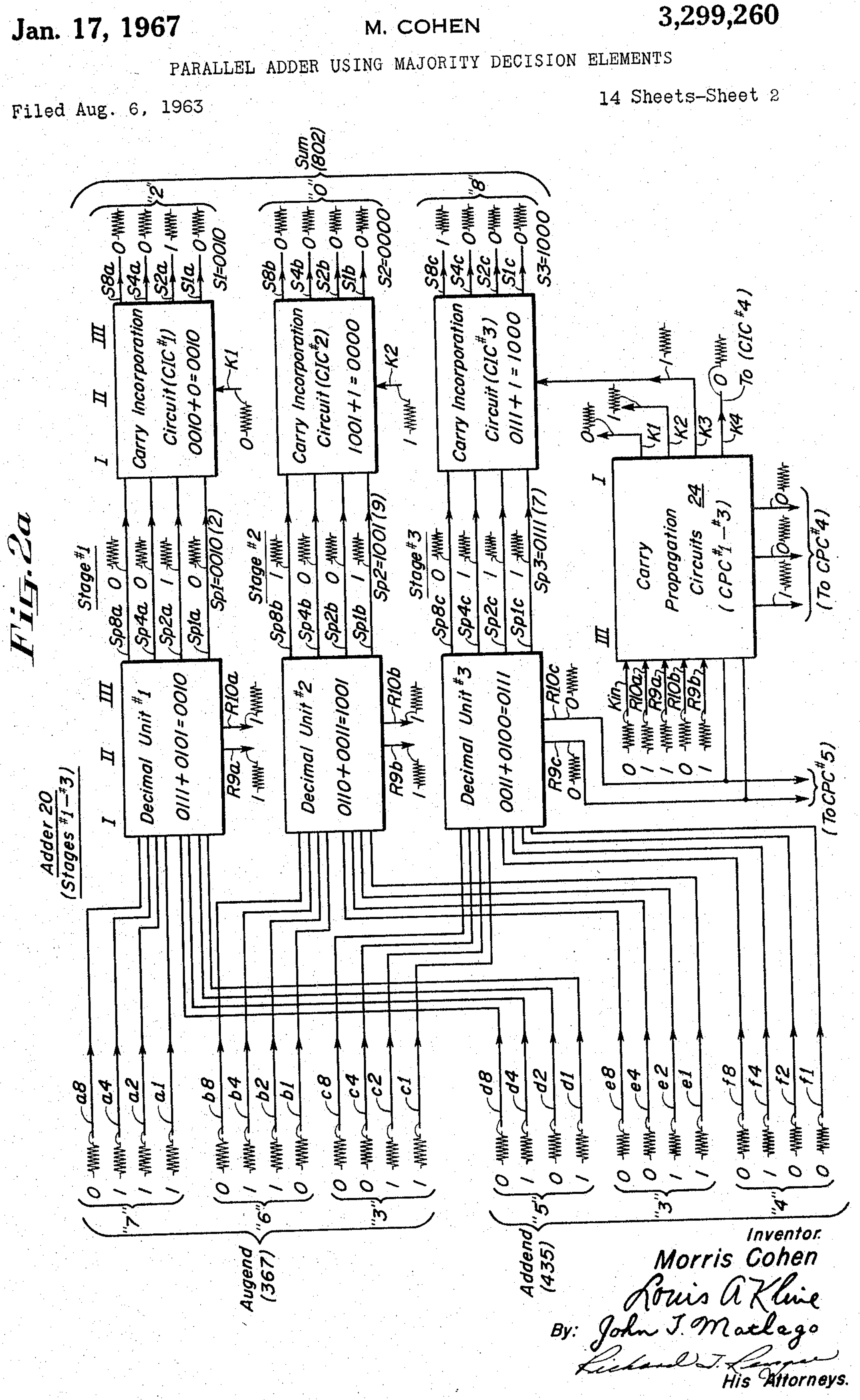

In FIG. 2*a*, adder stages #1 to #3 only are shown in the block diagram to provide a basis for a detailed description of the operation of system of the adder 20. The description of decimal adder stages #1 to #3 is typical of the operation of the various adder stages and the description of stages #1 to #3 will provide a complete understanding of the system operation of the adder 20. Each of the adder stages #1 to #12, for example, includes a decimal unit 22 and a carry incorporation circuit 26. Thus, adder stage #1 includes a decimal unit #1, a carry incorporation circuit (CIC #1), and a carry propagation circuit (CPC #1), which latter circuit is shown included with the other carry propagation circuits 24 (CPC #1–#3) in the lower part of the drawing. The adder stage #1 accepts binary-coded decimal signals representative of the lowest order decimal digits of the augend and addend, e.g., "7" and "5," to provide the lowest order decimal digit of the sum S1 thereof, e.g., "2," at its sum outputs S1*a*, S2*a*, S4*a* and S8*a*.

As shown in FIG. 2*a*, inputs to the decimal adder stage #1 include inputs *a*1, *a*2, *a*4 and *a*8 on which a set of four binary-coded decimal digit signals are applied representing the least significant decimal digit "7" of the augend; and inputs *d*1, *d*2, *d*4 and *d*8, on which a set of four binary-coded decimal signals are applied representing the least significant decimal digit "5" of the addend. The binary representation of decimal digits, such as provided by signals on inputs *a*1, *a*2, *a*4 and *a*8 is shown in the Table 1 of FIG. 4*a*. The binary signals which are representative of the binary states "0" and "1" comprise high frequency signals having a common parametric oscillation frequency (*f*) which is of the phases zero and pi radians, respectively. For example, when a majority decision element is oscillating at a high frequency having a phase of zero radian, the element is in the binary "0" state; and when a majority decision element is in oscillation in the phase of pi radians, the element is in the binary "1" state. The inputs *a*1, *a*2, *a*4, *a*8 and *d*1, *d*2, *d*4, *d*8 of decimal unit #1, as shown, comprise high frequency signals (*f*) having a phase of zero and pi radians, and a signal of a phase of zero radian is indicated by the binary digit "0" and a signal of pi radians is indicated by a binary digit "1."

To illustrate the operation of the adder 20, FIG. 2*a* shows the decimal unit #1 to have binary-coded decimal digit input signals "0111" for the decimal digit "7" and binary-coded decimal digit signals "0101" for the decimal digit "5." The partial sum (mod 10) S*p*1 of these input signals is "0010" which is produced during subclock III, of operating cycle No. 1 at outputs S*p*1*a*, S*p*2*a*, S*p*4*a* and S*p*8*a*. Also, binary signals "1" are produced during subclock II of operating cycle No. 1 at carry detector signal outputs R9*a* ($\geqq$9) and R10*a* ($\geqq$10) of the decimal unit #1 to be utilized in carry propagation in a manner to be described in detail later. The partial sums (mod 10) are produced in binary-coded decimal digit form directly without the need of modification or conversion as required in many prior systems. The partial sum (mod 10) S*p*1 of decimal unit #1 need not be modified or converted therefore, to binary-coded decimal digit form and the only operation that remains is to incorporate a carry input, if any, at the carry incorporation circuit (CIC #1) to provide the sum S1.

Decimal units #2 and #3 are arranged in parallel with decimal unit #1 and operate concurrently on the respective binary input signals for the remaining digits of the augend and addend to produce partial sums (mod 10) S*p*2 and S*p*3 for decimal adder stages #2 and #3, respectively. Decimal unit #2 responds to binary-coded decimal digit signals "0110" applied to inputs *b*1, *b*2, *b*4, *b*8 and signals "0011" applied to inputs *e*1, *e*2, *e*4, *e*8 to add the next higher order decimal digits "6" and "3" of the augend and addend to provide the partial sum (mod 10) S*p*2. Decimal unit #3 responds to binary-coded decimal digit signals "0011" applied to inputs *c*1, *c*2, *c*4, *c*8 and signals "0100" applied to inputs *f*1, *f*2, *f*4, *f*8 to produce the partial sum (mod 10) S*p*3 of the next higher order decimal digits "3" and "4" of the augend and addend, respectively. The carry signal outputs R9*a*–R10*a*, R9*b*–R10*b* and R9*c*–R10*c* of decimal units #1 to #3 are coupled to the carry propagation circuits 24 to provide for the propagation of the carry signals from the lower order stages to the higher order stages. As indicated, the carry outputs R9*c* and R10*c* are also coupled to carry propagation circuit #5 (CPC #5) to provide for propagation of the carry to higher order decimal adder stages.

Referring now more particularly to the carry propagation functions of the adder 20, as shown in FIG. 2*a*, the carry propagation circuits 24 (CPC#1–#3) are operative during subclock III of cycle No. 1 and subclock I of cycle No. 2. Accordingly, the carry signals provided by the decimal units #1 to #3 at the outputs R9*a*–R10*a*, R9*b*–R10*b* and R9*c*–R10*c* are produced prior to associated partial sums (mod 10) S*p*1, S*p*2 and S*p*3. The timing of operation of partial addition and carry detection in the decimal units #1–#3, carry propagation in circuits (CPC #3) and carry incorporation in circuits (CIC #1–#3) is indicated in the timing diagram FIG. 2*b*. The decimal units #1 to #3 include the operation of partial addition in operating cycle No. 1 during the time interval *t*0 to *t*3. The other operation of the decimal units #1 to #3 is the carry detection function in which a partial sum equal to or greater than nine (≧9) and/or equal to or greater than ten (≧10) is detected in the time interval *t*0 to *t*2 to produce binary "1" carry signals at the respective outputs R9*a* and R10*a*. The carry propagation circuits (CPC #1–#3) are operative in the time interval *t*2 to *t*4. These circuits begin their operation during subclock III of operating cycle No. 1 and continue over through subclock I of operating cycle No. 2. Thus, the carry signals at the outputs K1 to K3 of the carry propagation circuit 24 (FIG. 2*a*) are made available and applied to the carry incorporation circuits (CIC #1—#3), respectively, at time *t*4 during subclock II of operating cycle No. 2. The carry signals K1, K2 and K3 are applied to the carry incorporation circuits (CIC #1–#3), as shown, to be combined with the respective partial sums (mod 10) S*p*1, S*p*2 and S*p*3 to produce the sums S1 to S3 at the outputs of the carry incorporation circuits (CIC #1–#3) at the end of operating cycle #2 (time *t*6). The carry signal K4 is utilized in the higher adder stage #4 in carry incorporation circuit (CIC #4), not shown in FIG. 2*a*.

The operations of the adder 20 in providing the sum of the augend "367" and addend "435" are indicated as shown in the example in FIG. 2*c*. In the first column under the column heading "Decimal" the augend "367" and addend "435" are shown in decimal form. The binary-coded decimal form is shown in subsequent columns under the corresponding adder stage numbers #3, #2 and #1. The small letters in parenthesis (*a*) (*b*) (*c*) (*d*) (*e*) or (*f*), as shown, following respective groups of binary-coded decimal digits, e.g., "0111" (*a*), correspond to the respective letters designating the inputs of decimal units #1 to #3 The partial sums (mod 10) S*p* of the corresponding digits of the augend "367" and addend "435" are shown in decimal form "792" and in binary-coded decimal form "0111" (S*p*3), "1001" (S*p*2) and "0010" (S*p*1). The operation of partial addition is provided by partial adder circuits 30, 32, 34 and 36 (FIG. 3) of decimal units #1 to #3 to produce the partial sums (mod 10) which do not include the carry. Carry signals at outputs R9*a*–R10*a*, R9*b*–R10*b* and R9*c*–R10*c* are produced by carry detector circuits in the decimal units #1 to #3, e.g., carry detector circuit 38 (FIG. 3), and as indicated in the columns #3, #2 and #1 under the heading "Carry Propagation" (FIG. 2*c*). The carry signals K1, K2 and K3 are combined with the partial sums (mod 10) S*p*1, S*p*2 and S*p*3, respectively, in the carry incorporation circuits (CIC #1–#3) to produce binary-coded decimal digit sums "0010" (S1), "0000" (S2), and "1000" (S3) which correspond to the decimal sum "802" (S).

The addition of the augend "367" and the addend "435" to obtain the partial sum (mod 10) is clearly indicated in FIG. 2*c*. For example, the sum of decimal digits "7" and "5" equals "12" and the partial sum (mod 10) equals "2" with a decimal carry. In decimal unit #1 of adder stage #1, the addition of binary-coded decimal digits (equivalents of decimal digits "7" and "5") "0111" (*a*) and "0101" (*d*) produces a partial sum (mod 10) "0010" (S*p*1) which is the binary-coded decimal digit equivalent of the decimal digit "2." The carry signal K2, obtained during this partial addition, is indicated in the column #1 (FIG. 2*c*) of "Carry Propagation" (for adder stage #1). The carry signal K2 is produced as a result of the partial sum being equal to or greater than nine (≧9) and equal to or greater than ten (≧10) as shown by the binary carry signals "1" and "1" next to outputs (R9*a*) and (R10*a*). This carry signal K2 is applied to the carry incorporation circuit (CIC #2), FIG. 2*a*, to be combined with the partial sum output "1001" (S*p*2) of adder stage #2 (FIG. 2*c*). Thus, the partial sum "1001" (S*p*2), or decimal digit "9," is added to the carry (1) (K2) to produce the sum "0000" (S2), or decimal digit "0." It should be noted that while in the foregoing discussion, the carry signal (1) (K2) is produced in carry propagation as a result of a "1" bit at the output R10*a*, the carry signal (1) (K3) is produced in carry propagation as a result of a "1" bit at each of the outputs R9*b* and R10*a* even though a "0" bit is present at output R10*b*. This demonstrates, in part, the reason for producing outputs R9*a*, R9*b* and R9*c*, i.e., to produce carry signals in any adder stage after the partial sum is found to be equal to "9" in the presence of a carry signal K from a lower order stage. The carry signal (1) (K3) is added to the partial sum (mod 10) "0111" (S*p*3) of adder stage #3 to produce the sum "1000" (S3) for adder stage #3, or the decimal digit "8." Thus, the combined sum of the outputs of stages #1 to #3 is the decimal sum "802." In view of the foregoing discussion of FIG. 2*c*, certain operations of addition performed by each of the stages of adder 20 should now be readily apparent.

DETAILED DESCRIPTION OF ADDER STAGE #1 (FIG. 3)

Figures 1, 3:
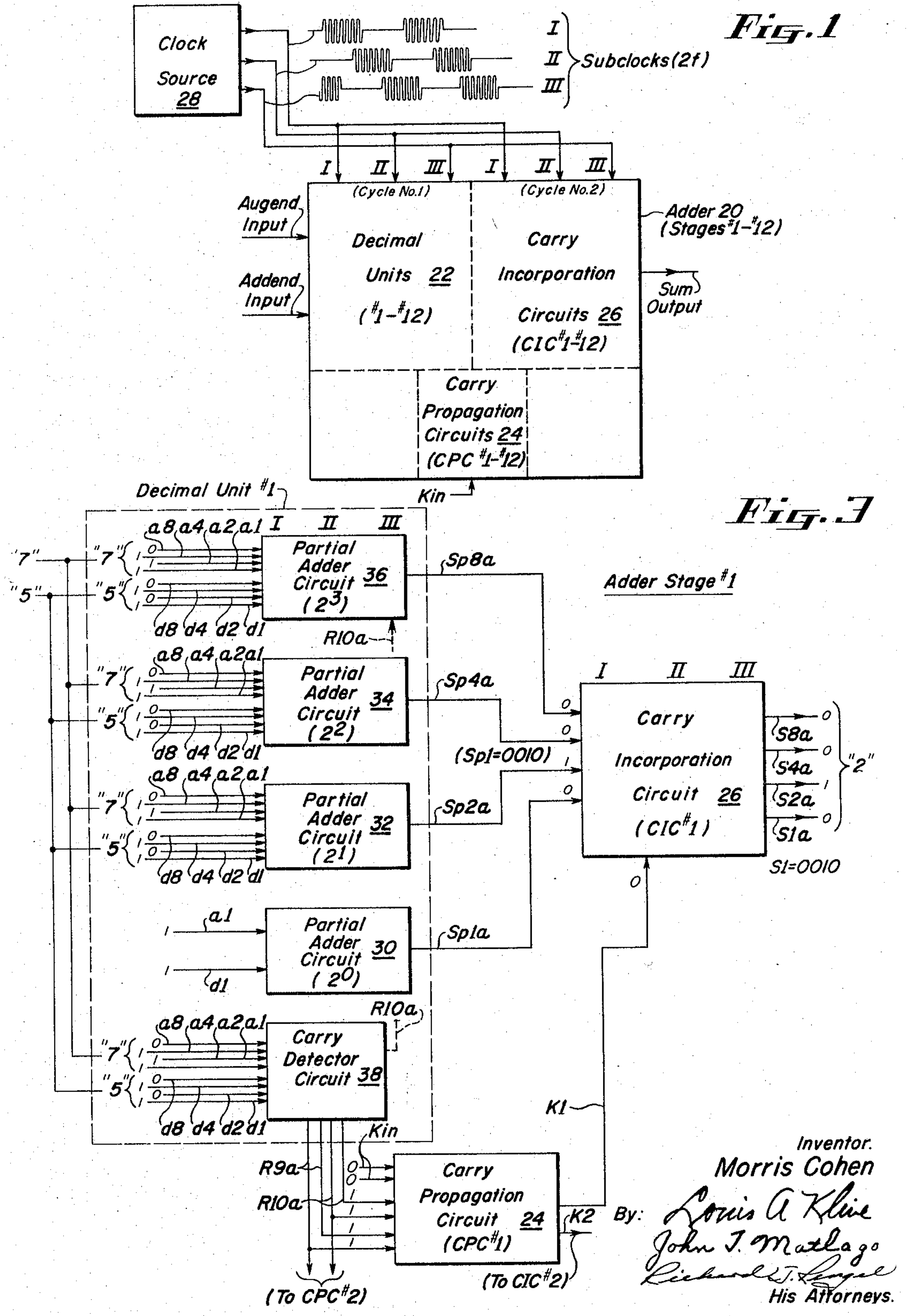

Referring to FIG. 3, the details of the decimal adder stage #1 are shown to include the decimal unit #1 which includes partial adder circuits 30, 32, 34, 36 and the carry detector 38. As stated before in the description of FIG. 2*a*, the adder stage #1 also includes the carry propagation circuit (CPC #1) and the carry incorporation circuit (CIC #1). The adder stage #1, as shown, is a typical adder stage of the adder 20. The partial sum (mod 10) (S*p*1=0010) is the partial sum of the least significant digits "7" and "5" of the augend "367" and addend "435" and is produced in adder stage #1 by the partial adder circuits 30, 32, 34, and 36. The first of these partial adder circuits, circuit 30, is shown to have only a single pair of inputs *a*1 and *d*1, and each of the remaining partial adder circuits for adder stage #1 has an input for each of the eight bits representing decimal digits "7" and "5." The carry detector circuit 38 is also provided with an input for each of the eight bits representing the decimal digits "7" and "5."

The partial sum outputs S*p*1*a*, S*p*2*a*, S*p*4*a* and S*p*8*a* (FIG. 3) of the partial adder circuits 30, 32, 34 and 36, respectively, are coupled directly to the carry incorporation circuit (CIC #1) to be incorporated with the carry output K1 from the carry propagation circuit (CPC #1) during subclock II of cycle No. 2. The combination of carry output K1 and the partial sum outputs S*p*1*a*, S*p*2*a*, S*p*4*a*, and S*p*8*a* in the carry incorporation circuit (CIC #1) produces the sum S1 for stage #1. Carry detector circuit 38 is responsive to the binary signal inputs for the decimal digits "7" and "5" to produce carry signals indicating whether a partial sum for stage #1 will be equal to or greater than nine (≧9) and/or equal to or greater than ten (≧10) by outputs R9*a* and R10*a*, respectively. The outputs R9*a* and R10*a* are coupled to carry propagation circuit (CPC #1) along with carry input signal K*in*. It should be noted that adder stage #1 actually does not ordinarily have a carry input signal K*in*, since it is the first stage of the adder. However, to show adder stage #1 as a typical stage, the carry input is shown with the signal K*in* as a binary "0" signal. Since the sum of exemplary decimal digits "7" and "5" is both equal to or greater than nine (≧9) and equal to or greater than ten (≧10), the output R9*a* is binary "1" and the output R10*a* is binary "1." Also, since carry input signal K*in* is binary "0" for the first stage, no carry digit into the adder stage #1 is present and hence output R9*a* is of use only when the partial sum in stage #1 is equal to or greater than ten (≧10). When the partial sum is equal to or greater than ten (≧10), both outputs R9*a* and R10*a* are binary "1" outputs and both of the "1" outputs are used in the carry propagation circuit (CPC #1) to produce an interstage carry signal K1. A more complete understanding of the operation of the carry propagation circuit (CPC #1) and use of outputs R9*a* and R10*a* therein will be provided by the detailed description of FIGS. 11*a* and 11*b*. While adder stage #1, as shown, is considered to be typical of the other adder stages, it is to be noted that the details of the carry propagation circuits 24 for the different adder stages are not identical. Therefore, carry propagation circuits are shown for each of the adder stages in FIGS. 11*a* and 11*b*. Before entering into a discussion of the details of operation of the various adder circuits shown in FIGS. 6 to 13, their diagrammatic representations will next be discussed in connection with FIGS. 5*a*, 5*b* and 5*c*.

Figures 5A, 5B, 5C:
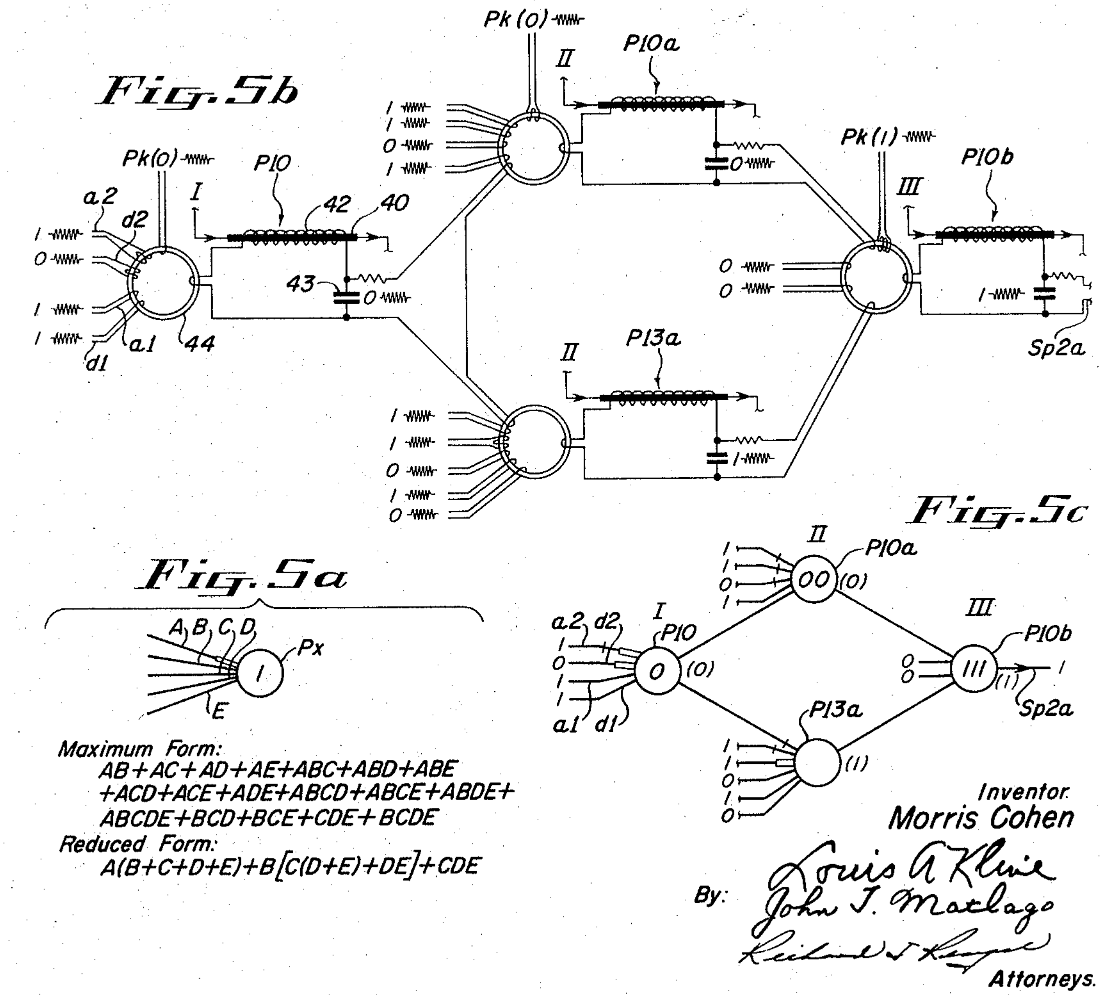

DESCRIPTION OF DIAGRAMMATIC REPRESENTATIONS OF CIRCUITS (FIGS. 5*a*, 5*b* AND 5*c*)

Certain circuit conventions have been employed which use symbols, notations and abbreviations in descriptions of parametric majority decision elements. Since the majority decision elements of the preferred embodiment of the present invention employ parametric elements, the schematic diagrams of the networks of majority decision elements have been shown in a simplified form to aid in the understanding of the operation. In FIG. 5*a*, a typical majority decision element P*x*, as used in the present embodiment, is shown to comprise a parametric element having control inputs A, B, C, D and E and a binary "1" constant control input indicated by the "1" in the circle (which circle is the symbol for the parametric element P*x*). The parametric element P*x* has control inputs which have equivalent value or weighted value of seven single control inputs, a double control input A (value=2); single inputs B, C, D and E; and a single constant binary "1" input (indicated by the "1" in the circle).

The complex function provided by the majority decision element P*x* (FIG. 5*a*) is shown by either one of the Boolean equations (shown in maximum form or reduced form) in order to provide some indication of the power and advantages of majority decision elements in a network for performing various logical functions such as those involved in the parallel addition of plural digit numbers. The realization of complex functions by a single majority decision element such as element P*x*, has been found to be effective in reducing the number of logical levels in performing such functions as addition.

Figure 7:
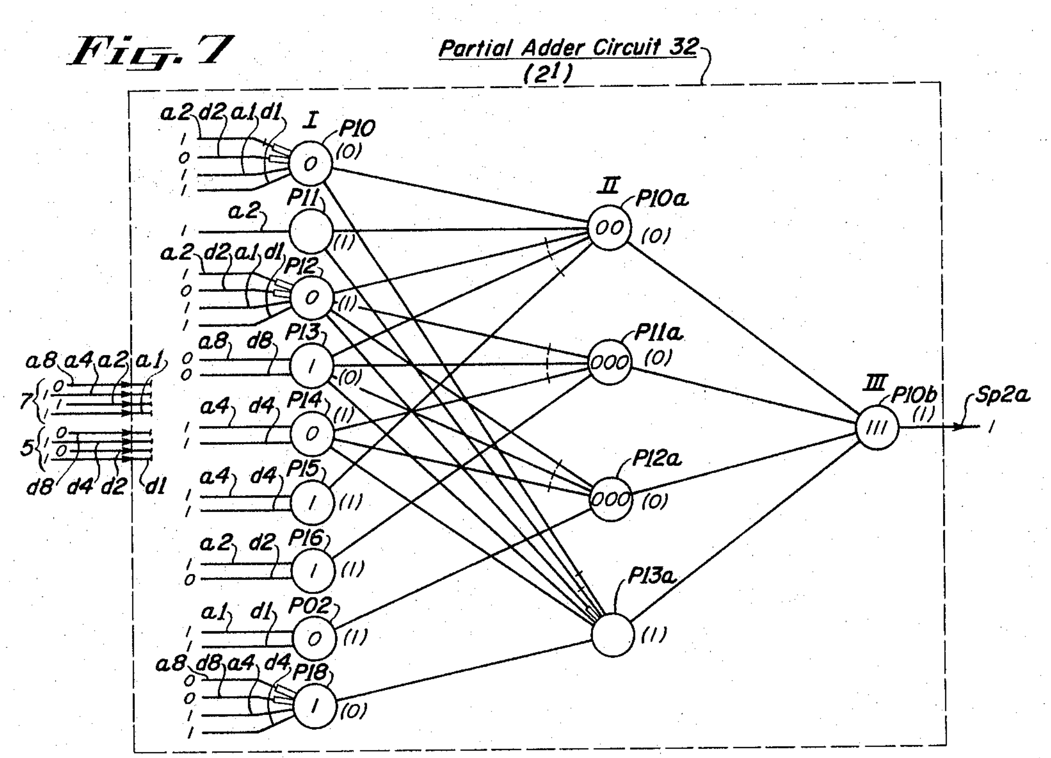

In FIG. 5*b*, only a portion of the partial adder circuit 32, shown in block diagram in FIG. 3 and in FIG. 7, has been shown for the sole purpose of illustrating the schematic diagram representations employed in the remainder of the drawings which show the details of the circuitry for the partial adder circuits and other circuits of the adder 20. In FIG. 5*c*, the circuit details shown in FIG. 5*b* are illustrated schematically to provide easy reference to the symbols, notations and representations used herein. Majority decision elements P10, P10*a*, P10*b* and P13*a*, as shown, comprise parametric elements of the type disclosed in the cited copending application. The majority decision element P10, for example, comprises a thin film magnetic rod 40 consisting of a copper-beryllium conductor substrate having a cylindrical, axially oriented, anisotropic thin film of nickel-iron alloy deposited thereon, e.g., by electro-deposition. The term "thin film" is used herein in its technical sense, i.e., the thin film exhibits single magnetic domain characteristics. As shown in FIG. 5*b*, subclock I is coupled to the conductor substrate to provide an exciting current in rod 40 which is inductively coupled to a winding 42. The tuned circuit including a capacitor 43*a*, oscillates at a frequency (*f*) which is one-half the frequency (2*f*) of the subclock I. The phase of the oscillations of the tuned circuit is controlled by the phase of the binary control signals (zero or pi radians) applied to the control inputs *a*1, *d*1, *a*2 and *d*2 and the phase of the constant signal (zero radian) applied to control input P*k* (0). All of these inputs are coupled to the tuned circuit by a toroidal core 44 functioning as a transformer, as shown in FIG. 5*b*. The phase of the resulting parametric oscillations produced by the element P10 is either zero or pi radians, corresponding to the binary stages "0" or "1," respectively. Accordingly, a majority value of control signal inputs of zero phase will cause the majority decision element P10 to produce parametric oscillations at the frequency (*f*) of the zero phase to provide an output signal having a frequency (*f*) of the zero phase corresponding to the binary state "0." However, it is important to note that a control input of the various majority elements can have a single value, double value, triple value (or more) in determining the majority value of the binary "1" or "0" signals applied to the control inputs and it is the resultant of these differently weighted control inputs which determines a net signal of binary "0" or "1" that controls the phase of parametric oscillations of any one of majority decision elements being considered. Thus, in FIG. 5*b*, the majority decision element P10, for example, has a control input *a*2, which has a double value (value=2) because the winding has two turns on the toroidal core 44. The effect of the two turns is to produce a control signal having twice the amplitude of a single value control input, such as control input *a*1, which has but a single turn. An example of a triple value input is illustrated by the constant control input P*k* (1) of the majority decision element P10*b*. It should be further noted that the direction of the winding on the core 44 is important. Thus, if the direction of the winding is reversed, the effect is to induce a signal of the opposite phase at the respective control input.

As noted before, the exemplary binary signals as shown in FIG. 5*b*, applied to control inputs for the majority decision element P10, place it in the binary "0" state. The control inputs *a*2 and *d*2 each have a double value and each of the control inputs *a*1 and *d*1 and constant control input P*k* have only a single value. However, a close examination of the control inputs to majority element P10 shows that the winding of input *a*2 is reversed relative to the other windings, to invert the phase of the binary "1" signal (pi phase) applied thereto to produce a double value binary "0" control signal (zero phase). In view thereof, the majority value of the control inputs to element P10 including the binary "0" constant control input P*k* (0) results in a binary "0" net signal having a phase of zero radian. Accordingly, the majority element P10 is caused to oscillate in the zero phase, which corresponds to the phase of zero radian of the net signal, to place the element P10 in the binary "0" state to produce a binary "0" signal (zero phase) at its output.

The binary "0" signal (zero phase) on the output of the majority decision element P10 is coupled to control inputs of majority decision element P10*a* and majority decision element P13*a* along with other binary signals applied to control inputs as shown in FIG. 5b. The binary signals applied to the control inputs, including the constant control input to the majority decision element P10a, have a majority value in the phase of zero radian, therefore, the majority decision element P10a is caused to oscillate in the phase of zero radian to produce the binary "0" signal at its output. The majority decision element P13a is placed in the binary "1" state by control signals having a majority value of a phase of pi radians to produce a binary "1" signal at its output. The binary "0" and "1" signals on the outputs of majority decision elements P10a and P13a are coupled to control inputs of the last majority decision element P10b, along with other control inputs, as shown in FIG. 5b, to produce a binary "1" net signal to cause the majority decision element P10b to be placed in a binary "1" state (phase of pi radians) to produce a binary "1" signal (pi radians) at its output Sp2a.

In FIG. 5c, the identical circuit shown in FIG. 5b has been shown simplified using the schematic illustrations employed hereinafter to describe the various circuit arrangements of the adder 20 of the present invention.

Corresponding reference numbers refer to corresponding parts in FIGS. 5b and 5c. In FIG. 5c, double value inputs (two turn windings), e.g., a2 and d2 are indicated by a single line having two branches leading into the majority decision element P10 (circle); and single value inputs (one turn windings), e.g., a1 and d1, each has only a single line leading into the majority decision element P10. The binary "0" constant control input Pk (0) is a single value input which is designated by the "0" inside the circle representing the majority decision element P10. Output lines of the majority decision element P10 are indicated by the lines projecting from the right side thereof. The two zeros (00) in the circle representing majority element P10a designate a double value binary "0" constant control input and the three ones (111) inside the majority element P10b designate a constant control input having a triple value of binary "1." It will also be noted that many of the majority decision elements have control input lines having a cross-bar, for example, as shown on the control input a2 for the majority element P10. The cross-bar indicates the windings are wound in the opposite direction to reverse the phase of the binary signal applied thereto, e.g., a binary input signal of pi radians, corresponding to a binary "1" signal, is inverted to produce a binary signal control input having a phase of zero radian corresponding to a binary "0" signal. The purpose and result is to convert a binary "1" input signal to a binary "0" control signal.

DETAILED DESCRIPTION OF THE PARTIAL ADDER CIRCUITS (FIGS. 6, 7, 8 AND 9)

Figure 6:
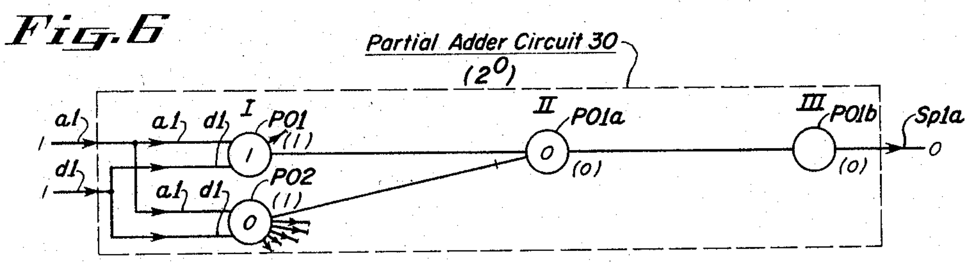

Referring briefly to previously described FIG. 3, decimal unit #1 is shown to include partial adder circuits 30, 32, 34 and 36. These partial adder circuits are responsive to two sets of four binary-coded decimal digit signals for the least significant digits "7" and "5" of the augend "367" and addend "435," as shown. These signals are applied to the adder inputs and are distributed to the partial adder circuits 30, 32, 34 an 36 as shown in FIG. 3, to be operated on by these partial adder circuits to produce a partial sum (mod 10) of the digits "7" and "5" at the outputs Sp1a, Sp2a, Sp4a and Sp8a. Referring to FIG. 6, the details of the partial adder circuit 30 are shown to include majority elements P01, P02, P01a and P01b connected in a network to provided a binary "0" signal at the partial sum output Sp1a in response to exemplary binary "1" signals applied to inputs a1 and d1. The binary stages of each of the majority elements P01, P02, P01a, and P01b in response to binary "1" signals at the inputs a1 and d1 are shown in FIG. 6 by the binary digits (0) or (1) adjacent to the respective majority element. In FIG. 4b, Table 3 indicates the binary states of the majority elements P01, P02, P01a and P01b in response to all the different possible combinations of binary "1" and "0" signals applied to inputs a1 and d1. In Table 3, under the respective column headings designating their respective majority elements, the zeros (0) have been omitted for clarity. It is to be understood that the binary "1" digits in any column position in this Table 3 designate that the corresponding majority element is placed in a binary "1" state and the absence of a binary digit at any column position designates that the corresponding majority element is placed in a binary "0" state. In view of the prior explanation of the operation of individual majority elements and networks of majority elements, the details of operation of the partial adder circuit 30 (FIG. 6) in response to combinations of binary signals "0" and "1" applied to inputs a1 and d1 should be clear, particularly in view of the following detailed discussion of its operation in connection with the exemplary binary signals "1" and "0" applied to its inputs a1 and d1 and the later general discussion of its operation. The partial adder circuit 30, having only two inputs a1 and d1, will be discussed first to show the manner in which the binary-coder decimal digit partial sum (mod 10) output Sp1a is obtained directly to provide the least significant bit of the partial sum Sp1 of adder stage #1. As shown in FIG. 6, the partial adder circuit 30 comprises an exclusive OR logical operator including majority decision elements P01 and P02 which are operative during subclock I of operating cycle No. 1 (FIG. 2b) and majority decision elements P01a and P01b which are operative during subclocks II and III, respectively, of operating cycle No. 1. The control inputs a1 and d1 to the partial adder circuit 30 are applied to both majority decision elements P01 and P02, as shown. When exemplary binary "1" signals are applied to both a1 and d1 inputs, as illustrated, a majority of binary "1" signals is present at the input of both majority elements P01 and P02. Accordingly, both elements are placed in a binary "1" state to provide binary "1" signals on their respective outputs.

The binary "1" signals on the respective outputs of majority elements P01 and P02 are coupled to control inputs of majority element P01a. One of these control inputs for the majority element P01a is inverted, as indicated in FIG. 6 by the cross-bar, to provide a binary "0" signal at this control input instead of a binary "1" signal. Since the majority element P01a has a constant binary "0" input (indicated by the "0" in the circle) the majority of the signals (2 of 3) or the net signal is binary "0." Accordingly, the majority element P01a is placed in binary "0" state and a binary "0" signal is produced at its output. Majority element P01b, operating during subclock III, has only a single control input which is coupled to the output of majority element P01a. Accordingly, the majority of binary signals (1 of 1) at the input of majority element P01b is binary "0" which places the majority element P01b in the binary "0" state to provide a binary "0" signal at the output Sp1a of the partial adder circuit 30.

In view of the above explanation, an examination of circuit 30 will clearly show that if both the binary signals at the inputs a1 and d1 are "0" bits, a binary "0" signal will likewise be produced at the output Sp1a. Furthermore, if the binary signal at one of the inputs a1 or d1 is a "0" bit and the other is a "1" bit, a binary "1" signal will be produced at the output Sp1a.

To summarize, the partial adder circuit 30 as shown in FIG. 6 is a network providing an exclusive OR function. This network is responsive to binary signals at inputs a1 and d1 to produce a binary "0" signals at the output Sp1a when both of the binary signals at the inputs a1 and d1 are "0" bits or "1" bits; and to produce a binary "1" signal at the output Sp1a when a binary "1" signal is applied to only one of the inputs a1 and d1.

In the foregoing description of the operation of the partial adder circuit 30, the output of majority element P02 is utilized to provide a control input to majority element P01a. It should be noted that the same majority element P02 is shown also in the partial adder circuits 32, 34 and 36 and in the carry detector circuit 38 in FIGS. 7 to 10, respectively. This separate showing of majority element P02 has been illustrated in this manner to provide a clear demonstration of the operation of the respective circuits but it should be realized that in practicing the invention, only one majority element P02 is required, having six outputs which are coupled to the respective majority elements as shown in FIGS. 6 to 10. Other majority elements, e.g., majority element P01, are similarly shown in the diagrams for the partial adder and carry detector circuits.

Figure 8:
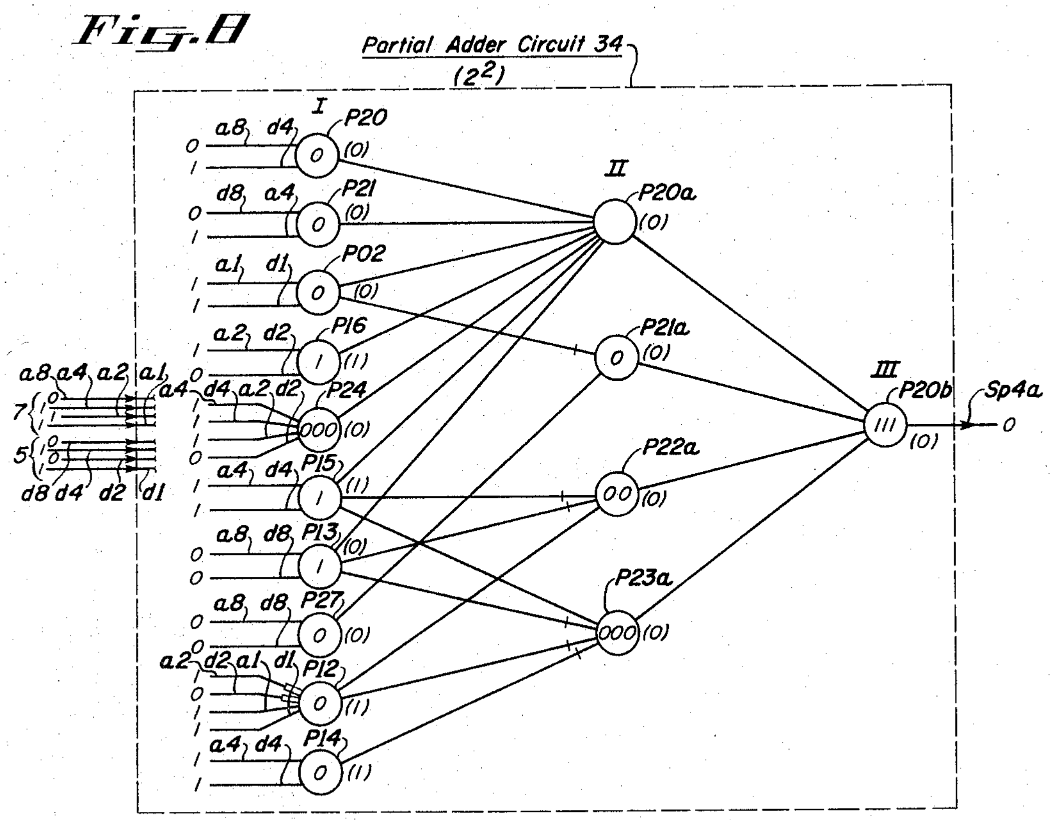
Figure 9:
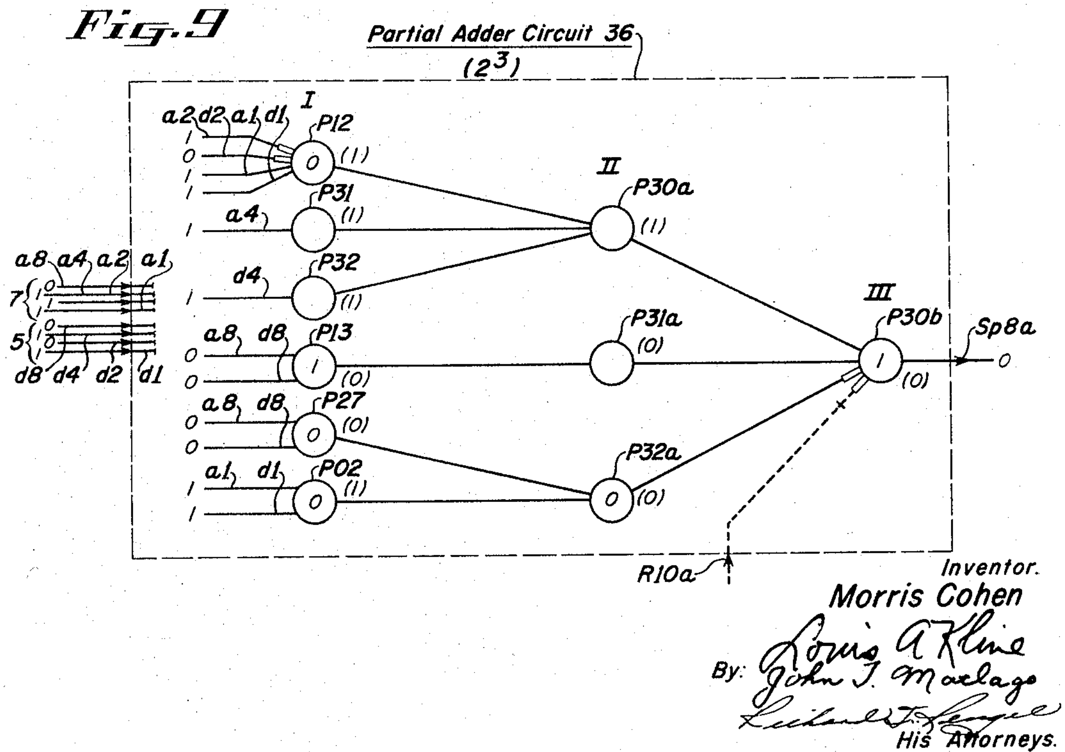

Referring now to FIG. 7, the details of the partial adder circuit 32, for producing a binary-coded decimal digit of the partial sum *Sp*1 at the output *Sp*2*a*, are shown therein. Before describing the operation of circuit 32 it should be noted that in FIGS. 7, 8 and 9, illustrating the partial adder circuits 32, 34 and 36, the adder inputs are indicated by the reference numbers *a*1, *a*2, *a*4, *a*8 and *d*1, *d*2, *d*4, *d*8 as before, but the interconnections of the adder inputs to the control inputs of the majority elements P10, P11, P12, P13, P14, P15, P16 P02 and P18 have not been shown but are indicated, instead, by corresponding reference numbers to simplify the drawings and thereby clarify the description.

Proceeding now to the description of the operation of the partial adder circuit 32 shown in FIG. 7, it will be seen wherein this circuit produces a "1" bit at the partial sum output *Sp*2*a* in response to any one of eight different partial sums which will place at least one of the majority elements P10*a* to P13*a* in a binary "1" state. These eight different partial sums are 2, 3, 6, 7, 12, 13, 16 and 17 and are shown in Table 2, FIG. 4*a*, under the decimal equivalent column heading *Sp*1 and also in corresponding rows having "1" bits under the column heading *Sp*2*a*. Four different conditions corresponding to the eight different partial sums are detected by the majority decision elements P10*a*, P11*a*, P12*a* and P13*a*. Thus, one or more of these four majority elements have binary "1" signal outputs when the partial sum is 2, 3, 6, 7, 12, 13, 16 or 17.

The partial adder circuit 32 comprises a basic network of majority elements P10, P11, P12 and P10*a*. This basic network, excluding other control inputs and constant control inputs (00), is a regular $2^1$ binary adder circuit and would place majority elements P10*a* in the binary "1" state whenever the partial sum of the augend and addend, in regular binary form, is equivalent to two (2) or some other higher value partial sum having a binary "1" in this order ($2^1$) bit position. The remainder of the network of majority elements shown in FIG. 7 is provided for correcting and thereby producing the proper binary "1" output *Sp*2*a* for only binary-coded decimal partial sums (mod 10) equivalent to 2, 3, 6, 7, 12, 13, 16 and 17, as desired. Thus, outputs of additional majority elements P13 and P15 are coupled to inverted control inputs of majority element P10*a* (along with constant binary "0" inputs to provide for the additional inputs to majority element P10*a*) to correct, i.e., to eliminate unwanted binary-coded decimal partial sums (mod 10). The resulting network for majority element P10*a*, as shown in FIG. 7, thus prevents P10*a* from being placed in a binary "1" state whenever a binary "1" signal is applied to any one of the inputs *a*8, *d*8, *a*4, or *d*4 (*a*8+*d*8+*a*4+*d*4) to eliminate binary "1" outputs from circuit 32 when the partial sum is ten, for example. In the process of correcting the network for majority element P10*a* by additional control inputs from elements P13 and P15, overcorrection has resulted and certain partial sums requiring a binary "1" signal at output *Sp*2*a* also have been eliminated. These partial sums are: 6, 7, 12 and 13 when a "1" bit is applied to inputs (*a*4 and/or *d*4) of element P15; and 12, 13, 16 and 17 when a "1" bit is applied to inputs (*a*8 and *d*8) or (*a*8 or *d*8) or (*a*4 and *d*4) or (*a*4 or *d*4). To provide a binary "1" signal at output *Sp*2*a* for each of the partial sums of 6 and 7, majority elements P11*a* or P12*a* are placed in a binary "1" state by partial sums of 6 and 7 when a binary "1" is applied to either of the inputs (*a*4 or *d*4) but not both. For partial sums 12, 13, 16 and 17, majority element P13*a* is placed in the binary "1" state to provide a binary "1" signal at output *Sp*2*a*.

In Table 4, FIG. 4*c*, the operation of the partial adder circuit 32 is indicated by the binary states of the respective majority decision elements in response to the sets of "0" and "1" binary-coded decimal signals applied to the control inputs *a*1, *a*2, *a*4 and *a*8 for the augend and *d*1, *d*2, *d*4 and *d*8 for the addend. The partial sum for the indicated augend and addend is shown in decimal form in the left column of Table 4. The corresponding binary states of the majority decision elements P10, P11, P12, P13, P14, P15, P16, P02, P18, P10*a*, P11*a*, P12*a*, P13*a* and P10*b* are shown in the respective columns at the right of Table 4. As in Table 3, FIG. 4*b*, only the binary "1" digits have been shown in Table 4 for clarity, and the absence of a digit in a column position indicates that the corresponding majority element is placed in a binary "0" state. Table 4 shows all of the partial sums which produce a binary "1" signal at output *Sp*2*a*. As is known and evident from Table 4, different (weighted) arrangements of binary-coded decimal digits of the augend and addend produce the same partial sums. Therefore, to simplify Table 4 (and also Table 5, FIG. 4*d* and Table 6, FIG. 4*e*) only typical arrangements of binary-coded decimal digits in the augend and addend for partial sums have been selected and shown therein. In Table 4, the exemplary partial sum "12" along with its corresponding arrangement of binary-coded decimal digits of the augend and addend and the binary states of the majority elements for responding to this arrangement have been enclosed by a heavy line for easy reference thereto in the detailed description which follows.

Referring now to FIG. 7 for a detailed description of the network of majority elements shown therein, the outputs of majority elements that are operative during subclock I of cycle No. 1 are coupled to predetermined majority elements P10*a*, P11*a*, P12*a* and 13*a* which are made operative during subclock II and assume binary states "0" and "1" according to the majority value established at their respective control inputs including constant control inputs. As noted previously, any one of the majority elements P10*a*, P11*a*, P12*a* or P13*a* is capable of placing the majority element P10*b* in the binary "1" state. For example, the majority element P13*a* is shown to be in the binary "1" state and its output is coupled to the control input of majority element P10*b* to place the latter in the binary "1" state. The operation of majority element P10*b* is similar to a logical OR circuit. Thus, the provision of a "1" bit on its constant control input which is a triple value control input and any other "1" bit on one of its control inputs will provide the equivalent of a majority of four "1" bits (4 or 7) on the control inputs of majority element P10*b* to place it in the binary "1" state.

An exemplary operation of each majority element shown in FIG. 7 will now be described to illustrate the operation of the partial adder circuit 32. As shown, the exemplary sets of binary-coded decimal signals for decimal digits "7" and "5" are applied to the inputs of the partial adder circuit 32. The majority elements P10, P11, P12, P13, P14, P15, P16, P02 and P18 are operative during subclock I of operating cycle No. 1 and will be considered first. The majority element P10 is placed in a "0" state by a binary "0" net signal produced by the "1011" bits on the control inputs *a*2, *d*2, *a*1 and *d*1, respectively. The "1" bit applied to the double value *a*2 input is inverted, as indicated by the cross-bar on the *a*2 input line and therefore it is effective to apply the equivalent of two binary "0" signals to element P10. A "0" bit is applied to the input *d*2 and since it is a double value input, it is effective to apply the equivalent of two binary "0" signals to the majority element P10. Control inputs *a*1 and *d*1 and "1" bits applied thereto, however, the equivalent of four binary "0" signals (4 or 7) is provided by inputs *a*2 and *d*2 to produce a binary "0" net signal which places the majority element P10 in a binary "0" state. The majority element P11 has only a single control input *a*2 and the "1" bit applied to the control input *a*2 places the majority element P11 in the binary "1" state. The majority element P12 is placed in the binary "1" state *a*2 and "1" bits applied to single value control inputs *a*1 and *d*1 which provide a binary "1" net signal. The majority element P13 has a "1" bit applied to the constant control input and "0" bits applied to two single value control inputs *a*8 and *d*8. The majority element P13 is placed in the binary "0" state by the "0" bits applied to the control inputs *a*8 and *d*8. The majority element P14 is placed in the binary "1" state by the "1" bits applied to control inputs *a*4 and *d*4. The majority element P15 is placed in the "1" state by the majority of "1" bits applied to the control inputs *a*4, *d*4 and its binary "1" constant control input. The majority element P16 is placed in the binary "1" state by "1" bits applied to the control input *a*2 and its binary "1" constant control input. Majority element P02 is placed in the binary "1" state by the "1" bits applied to control inputs *a*1 and *d*1. The majority element P18 is placed in the binary "0" state by the "0" bits applied to the double value inputs *a*8 and *d*8 which provide a majority of four (4 of 7) and a binary "0" net signal.

Continuing the description of the individual majority elements shown in FIG. 7, the majority elements operative during subclock II, namely, P10*a*, P11*a*, P12*a* and P13*a*, are also placed in binary states corresponding to the majority value of the control signals applied to their control inputs. Majority element P10*a* has a double value binary "0" constant control input (00), two single value control inputs coupled to the outputs of majority elements P10 and P11 and three inverted, single value control inputs coupled to the outputs of majority elements P12, P13 and P15, respectively. The majority element P10*a* is placed in binary "0" state by the double value, binary "0" constant control input (00), the control input coupled to the binary "0" signal output of element P10 and the inverted control inputs coupled to the binary "1" signal outputs of majority elements P12 and P15. This provides the equivalent of five binary "0" signals applied to the inputs of the majority element P10*a* and results in a binary "0" net signal which places this majority element P10*a* in the "0" state.

Majority element P11*a* is placed in the binary "0" state by triple value, binary "0" constant control input (000) and inverted binary "1" control inputs coupled to the outputs of majority elements P12, P13 and P14 which provide a majority of five (5 of 7) at these inputs and a binary "0" net signal. Majority element P12*a* is also placed in the binary "0" state by its triple value binary "0" constant control input and inverted binary "1" outputs of majority elements P12, P13 and P14. The control inputs to majority element P13*a* include two, single value inverted control inputs, a double value input and three single value inputs. A majority value (4 of 7) and a binary "1" net signal is provided for majority element P13*a* to place it in the binary "1" state by the inverted control input coupled to majority element P10, the double value input coupled to majority element P12, and the control input coupled to the majority element P14. Accordingly, the output of majority element P13*a* is a "1" bit and this output plus the triple value constant input (111) to majority element P10*b* is sufficient to place the majority element P10*b* in a "1" state during subclock III to provide a "1" bit at the output S*p*2*a* for the partial adder circuit 32. The majority element P13*a* is thus placed in the binary "1" state to provide a binary "1" output which is coupled to the majority element P10*b* to place element P10*b* in the binary "1" state to provide the necessary "1" bit at the output S*p*2*a* for the exemplary partial sum of "12." As can be seen by reference to Table 4, FIG. 4*c*, the majority element P13*a* is placed in the binary "1" state in response to binary signals whose partial sum is 12, 13, 16 and 17. According to the exemplary decimal digits applied, i.e., "7" and "5," the partial sum is "12" and therefore, as shown, the majority element P13*a* is placed in the "1" state by the outputs of certain majority elements operative during subclock I, as shown in FIG. 7.

The partial adder circuits 32 and 30 described supra provide the two lower order binary digits "1" and "0," respectively, of the partial sum (mod 10) shown in FIG. 3, i.e., (S*p*1=0010). The remaining two higher order binary digits (00) of this partial sum (mod 10) are provided at the outputs S*p*8*a* and S*p*4*a* which are the outputs of the partial adder circuits 36 and 34 shown in FIGS. 8 and 9, respectively.

Referring now to FIG. 8, the details of partial adder circuit 34 are shown and the operation of partial adder circuit 34 is illustrated by Table 5, FIG. 4*d*. Table 5 is similar to Table 4 referred to in connection with the description of FIG. 7. A detailed description of the operation of circuit 34 does not appear necessary in view of Table 5, and the operation as shown by the indication of the states of the majority elements in response to decimal-coded binary inputs corresponding to the exemplary decimal digits "7" and "5," as shown in FIG. 8. In response to the binary-coded decimal signals applied to the adder inputs *a*1, *a*2, *a*4, *a*8 and *d*1, *d*2, *d*4 and *d*8; the majority elements of the partial adder circuit 34 are placed in the binary states "0" and "1" as indicated, and a "0" bit is produced at the output S*p*4*a*.

Referring now to FIG. 9, the operation of the partial adder circuit 36 is illustrated by Table 6 wherein the partial sums producing a binary "1" signal on the output S*p*8*a* are shown. The binary signals applied to the adder inputs for the addition of exemplary decimal digits "7" and "5" place the majority elements, shown in FIG. 9, in the binary states as indicated, to produce a "0" bit on the output S*p*8*a*.

The general arrangement and operation of the partial adder circuit 36, FIG. 9 will now be described. This general description will serve to further demonstrate the manner in which this partial adder circuit and other partial adder circuits employ certain majority logic concepts to provide one of the bit outputs of the partial sum in response to augend and addend inputs. The partial adder circuit 36, as shown, comprises majority decision elements P12, P31, P32, P13, P27 and P02, which are operative during subclock I of cycle No. 1; majority decision elements P30*a*, P31*a* and P32*a*, which are operative during subclock II of cycle No. 1; and majority decision element P30*b* which is operative during subclock III of cycle No. 1. A binary "1" signal at the output S*p*8*a* designates a partial sum (decimal) of "8," "9" or "18" wherein the signal on the output S*p*8*a* occupies the highest order bit position ($2^3$) of the partial sum (mod 10) S*p*1 (see Table 2, FIG. 4*a*).

In operation, majority element P30*a* will be discussed first and it is in the binary "1" state only when the sum of the augend and addend lower order bits ($2^0$, $2^1$ and $2^4$) is equal to or greater than eight ($\geqq 8$). When this condition occurs, majority element P32*a* is in the "0" state because respective networks including these elements P30*a* and P32*a* are mutually exclusive. This mutually exclusive relationship exists, because binary "1" signals must be applied to both inputs *a*8 and *d*8 to place the element P32*a* in the binary "1" state and binary "1" signals must be applied to inputs *a*4 and/or *d*4 to place element P30*a* in the binary "1" state. Since a set of four binary-coded decimal digit signals representing a single decimal digit do not include the set (1100), the foregoing relationship is valid and both elements P30*a* and P32*a* cannot be in the binary "1" state simultaneously. Therefore, when a binary "1" signal is applied to input *a*4, a binary "0" must be applied to input *a*8; and when a binary "1" is applied to input *b*4 a binary "0" must be applied to input *b*8. Now if element P30*b* is to be placed in the binary "1" state when element P30*a* is placed in the binary "1" state, two more control inputs to P30*b* (excluding P32*a*) must apply binary "1" signals. One of these two inputs is connected to output R10*a*. Since this input is inverted, a binary "0" signal must be supplied by output R10*a* which means that the partial sum is less than ten. Thus, when element P30*a* is in the binary "1" state and a binary "0" signal input is supplied by output R10*a*, these conditions indicate that the partial sum is both equal to or greater than eight (⋝8) and less than (10) and therefore, the partial sum is either equal to eight (8) or equal to nine (9).

In a further discussion of the operation of FIG. 9 and relative to majority element P32*a*, it should be noted that element P32*a* can only be placed in the binary "1" state when inputs *a*8, *d*8, *a*1 and *d*1 are all in the binary "1" state. This means that the partial sum is equal to eighteen (in this condition, binary "0" signals are present on inputs *a*2, *d*2, *a*4 and *d*4 in order to conform to the binary-coded decimal digit form) and that element P30*b* is placed in the binary "1" state. This is accomplished because element P31*a* is also placed in the binary "1" state whenever element P32*a* is in the binary "1" state and between them they provide the necessary majority of binary "1" signals to the inputs of majority element P30*b* to place it in the binary "1" state. The only other combination of augend and addend inputs that places majority element P30*b* in the binary "1" state is when the partial sum is either eight (8) or nine (9) and a binary "0" signal is present on input *a*4 and input *d*4. In this case, either input *a*8 or input *d*8 provides a binary "1" signal which places elements P13 and P31*a* in a binary "1" state, and then the output of element P31*a* and output R10*a* (partial sum less than 10) provide binary "1" signals on the input to element P30*b* to place element P30*b* in a binary "1" state.

To complete the description of the partial adder circuit 36, FIG. 9, it will now be demonstrated that no partial sum less than eight or between ten and seventeen inclusive, can place majority element P30*b* in the binary "1" state. For a partial sum less than eight (8) elements P30*c*, P31*a* and P32*a* are placed in the binary zero (0) state since both elements P30*a* and P31*a* require that the partial sum be eight (8) or greater to be in the binary "1" state and element P32*a* requires that the partial sum be equal to eighteen (18). The outputs of these majority elements (P30*a*, P31*a* and P32*a*) provide binary "1" inputs to element P30*b* thereby assuring that element P30*b* will be placed in the binary "0" state when the partial sum is less than eight. When the partial sum is between ten (10) and seventeen (17) inclusive, element P32*a* is placed in the binary "0" state because the partial sum is not equal to eighteen, and a binary "0" signal is supplied by the inverted binary "1" signal on the output R10*a* (a binary "1" signal on output R10*a* indicates that the partial sum is equal to or greater than ten). Thus, binary "0" signals on four of the seven inputs of P30*b* provide a majority (4 of 7) of binary "0" signals to place the element P30*b* in a binary "0" state.

From the foregoing description of the operation of partial adder circuit 36, the operation of this circuit in response to the exemplary sets of binary signals for decimal digits "7" and "5" to produce a binary "0" signal output S*p*8*a*, is clear from the drawings wherein the binary state "1" or "0" of each majority element is indicated in the parenthesis adjacent to respective element.

CARRY DETECTOR CIRCUIT 38 (FIG. 10)

Figure 10:
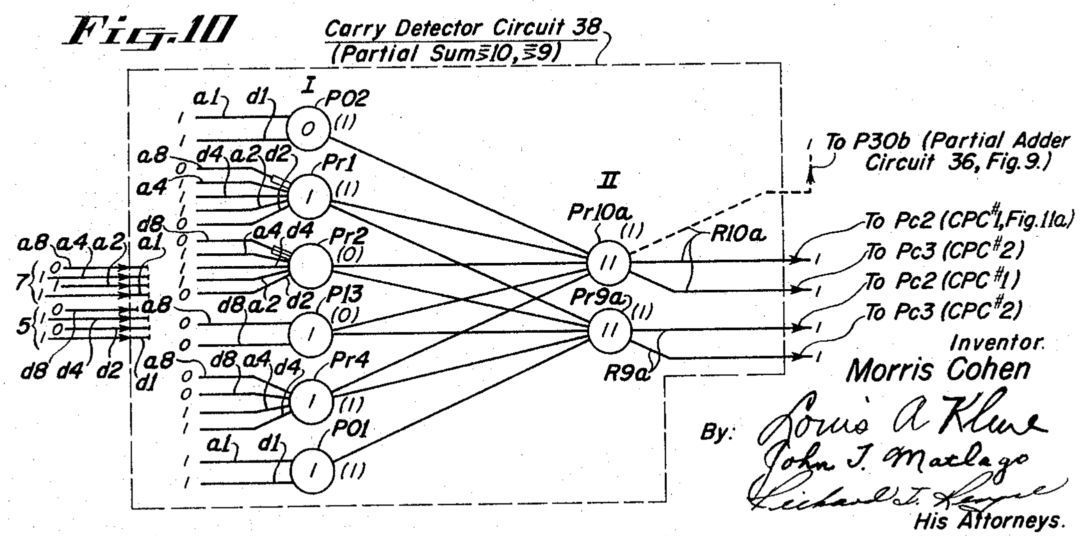

The carry detector circuit 38, shown in FIG. 10, provides two carry signal outputs R9*a* and R19*a* which are coupled to the carry propagation circuits (CPC #1 and #2) and circuit 36 as indicated in the drawing. The carry detector circuit 38 is typical of the carry detector circuits for the different decimal units #1 to #12 of adder stages #1 to #12. In accordance with the foregoing description, the specific carry detector circuit 38 is the carry detector circuit for decimal unit #1 of adder stage #1 which is shown in block diagram in FIG. 3. In operation, the carry detector circuit 38 provides signals on outputs R10*a* and R9*a* to indicate in advance during subclock II of cycle No. 1 whether the partial sum from the associated adder stage #1 is equal to or greater than ten (⋝10) and/or equal to or greater than nine (⋝9) respectively. These signals on outputs R10*a* and R9*a* are used in the carry propagation circuits (CPC #1 and #2) to determine when adder stages #1 and #2 will require the inclusion of a carry. In order to provide for early propagation of carry signals, the carry signal outputs R10*a* and R9*a* of the carry detector circuit 38 are available before the outputs S*p*1*a*, S*p*2*a*, S*p*4*a* and S*p*8*a* of the partial adder circuits 30, 32, 34 and 36, respectively.

Figure 2B:
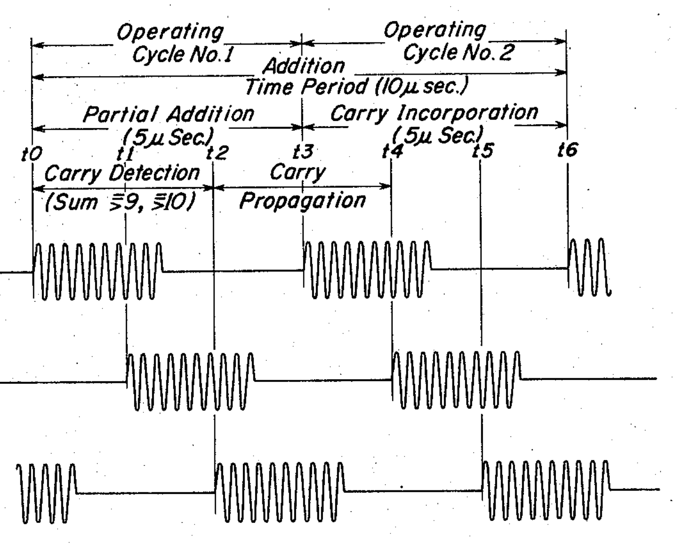

Considering now the individual majority elements of the carry detector circuit 38, FIG. 10, partial sum equal to or greater than nine (⋝9) is indicated by the binary "1" state of majority element P*r*9*a* and a "1" bit on each of the outputs R9*a*. It should be noted that letters (P*r*) in a reference character designate a majority element in a carry detector circuit only. A partial sum equal to or greater than ten (⋝10) is indicated by the binary "1" state of majority element P*r*10*a* and a "1" bit on each of the outputs R10*a*. These majority elements P*r*10*a* and P*r*9*a* are operative during subclock II of operating cycle No. 1 (FIG. 2*b*) and have control inputs coupled to the outputs of majority elements P02, P*r*1, P*r*2, P13, P*r*4 and P01 (FIG. 10) which are operative during subclock I of operating cycle No. 1 (FIG. 2*b*).

The operation of the carry detector circuit 38, FIG. 10, will be discussed first in connection with similarities and differences of this circuit's outputs R10*a* and R9*a*. The outputs R10*a* and R9*a* are, in most instances, the same, i.e., both have binary "1" outputs for partial sums equal to or greater than ten (⋝10) and both have binary "0" outputs for partial sums less than nine (9). The outputs R10*a* and R9*a* differ only when the partial sum is equal to nine (9) wherein only the output R9*a* is a binary "1" and the output R10*a* is a binary "0."

Also, as shown in FIG. 10, majority elements P*r*10*a* and P*r*9*a* have five of their respective six control inputs connected to five common binary signal sources (outputs of elements P*r*1, P*r*2, P13, P*r*4 and a double value, constant binary "1" input). The remaining (sixth) inputs of elements P*r*10*a* and P*r*9*a* are connected to different sources, i.e., elements P0*a* and P0*l*, respectively. Since the double value binary "1" inputs to elements P*r*10*a* and P*r*9*a* are constant, only two of the other control inputs of each of these majority elements need be binary "1" signal inputs to produce a binary "1" signal on each of the outputs R10*a* and R9*a*. If the outputs of elements P01 and P02 are disregarded for the purpose of analysis of the other inputs to P*r*10*a* and P*r*9*a*, it is seen that at least two of the elements P*r*1, P*r*2, P13 and P*r*4 need to provide binary "1" signals to place both elements P*r*10*a* and P*r*9*a* in the binary "1" state to provide a binary "1" signal on both outputs R10*a* and R9*a*. Accordingly, whenever two or more of the elements P*r*1, P*r*2, P13 and P*r*4 are in a binary "1" state, the partial sum is ten (10) or more.

Because majority elements P*r*10*a* and P*r*9*a* differ only in the inputs from P0*a* and P0*l*, respectively, then the differences that exist when the partial sum is equal to nine (9) can only be a result of the differences in the networks controlling majority elements P02 and P01. Considering the network of majority element P02, it is seen that this network provides an AND logical operator for inputs *a*1 and $d1$ while majority element P01 provides an OR logical operator for inputs $a1$ and $d1$. A binary "1" on the output of element P02 indicates a partial sum of at least two (2) and a binary "1" on the output of element P01 indicates a partial sum of at least one (1) with respect to signals on inputs $a1$ and $d1$ only. For a partial sum (equal to nine), one and only one of the outputs of elements $Pr1$, $Pr2$, P13 and $Pr4$ must be a binary "1" output. Accordingly, only one of these latter binary "1" outputs must indicate a partial sum of at least eight (8). Any one, and only one of the majority elements $Pr1$, $Pr2$, P13 and $Pr4$ that is placed in the binary "1" state, for any one of the valid binary-coded decimal combinations, is as follows: element P13 in response to a "1" bit on either input $a8$ or $d8$; element $Pr4$ in response to a "1" bit on both inputs $a4$ and $d4$; and element $Pr1$ in response to "1" bits on inputs $a4$, $a2$ and $d2$, or inputs $d4$, $a2$ and $d2$.

The remaining condition of circuit 38 is that none of the inputs to elements $Pr1$, $Pr2$, P13 and $Pr4$ place all of them in binary "0" states for a partial sum of seven (7) or less. As shown in FIG. 10, the inputs to elements $Pr1$, $Pr2$, P13 and $Pr4$ place all of them in binary "0" states for a partial sum of seven (7) or less.

As indicated in FIG. 10, two of the inputs R10$a$ and two of the outputs R9$a$ of the carry detector circuit 38 are indicated as coupled to majority elements $Pc2$ and $Pc3$, of the carry propagation circuits (CPC #1–#2) shown in FIG. 11$a$. The remaining output R10$a$ (FIG. 10) is coupled to majority element P30$b$ of the partial adder circuit 36 as shown in FIG. 9.

Mathematically, the only information required to determine which adder stages require a carry is a signal indicating that the partial sum is equal to or greater than ten (≧10) (provided by output R10$a$) and a signal indicating that the partial sum is equal to nine. Therefore, the "greater than" part of "equal to or greater than nine" (≧9) of the output R9$a$, is redundant information. But, as will be seen from the description of the carry propogation circuits 24 which follows, certain advantages result from providing redundant information. The most desirable advantage is that the carry propagation function is accomplished in less time by providing outputs R10$a$ and R9$a$ indicating the partial sums are both equal to or greater than ten (≧10) and equal to or greater than nine (≧9).

CARRY PROPAGATION CIRCUITS (FIGS. 11$a$ AND 11$b$)

Before considering the details of operation of the networks of majority elements of the carry propagation circuits 24, certain general characteristics of these circuits will be presented to provide a better understanding of the details to be described later. In FIG. 11$a$, carry propagation circuits 24 for adder stages #1 to #8 have been shown, and in FIG. 11$b$ the carry propagation circuits for adder stages #9 to #12 have been shown. As before, individual carry propagation circuits have been indicated by the abbreviations CPC #1, CPC #2–CPC #12. The letters $Pc$ in a reference character designate a majority element in the carry propagation circuits with the exception of elements $Pcin$ and $Pcs$. In order to clearly demonstrate the operation of the carry propagation circuits 24, second logical level portions only (operative during subclock II of cycle No. 1) of the carry detector circuits for adder stages #1 to #12 have been shown in FIGS. 11$a$ and 11$b$. For example, majority elements $Pr9a$ and $Pr10a$ for carry detector circuit 38 (FIG. 10) have been shown for adder stage #1. In this manner, the sources of binary signals for majority elements $Pc2$, $Pc3$, $Pc4$, $Pc5$–$Pc13'$ of the carry propagation circuits 24 can be readily ascertained by noting the connections to the outputs R9$a$–R10$a$, R9$b$–R10$b$, R9$c$–R10$c$—R9$m$–R10$m$ of the respective majority elements of the carry detector circuits for the respective adder stages #1 to #12, as shown. Also, it should be noted that the first majority element $Pcin$, as shown in FIG. 11$a$, is provided for supplying carry signal inputs derived during a prior addition of lower order digits (if any) of the augend and addend (if augend or addend is more then twelve decimal digits) and the carry signal is to be propagated in the present addition of digits. Addition of more than twelve, e.g., twenty-four decimal digits, is often referred to as "double precision" addition. Under "double precision" addition, the binary-coded decimal digits for decimal orders above 12 are supplied to the adder inputs for decimal units #1 to #12 during subclock I of operating cycle No. 2. Thus, the carry signal produced in majority element $Pcin$ by overflow from lower order digits is available during subclock II of operating cycle No. 2 along with the other carry detector signal outputs for the higher order digits. Outputs $ka$, $kh$ and $kj$ are supplied to control inputs of $Pcin$ by carry propagation circuit (CPC #8) shown in FIG. 11$a$ and carry propagation circuit (CPC #12) shown in FIG. 11$b$. A binary "1" constant signal is applied to control input $Kp$ during each subclock II of those operations involving "double precision" addition. For the present exemplary description of the adder 20, no carry digit into stage #1 is contemplated and a binary "0" carry signal, therefore, is present on output $Kin$ of majority element $Pcin$.

In operation, the first logical level of majority elements $Pc1$, $Pc2$, $Pc3$, $Pc4$, $Pc5$–$Pc13'$ of the carry propagation circuits 24, as shown in FIGS. 11$a$, and 11$b$, is made operative during subclock III of operating cycle No. 1 (FIG. 2$b$). The second logical level of majority elements $Pc1a$, $Pc2a$, $Pc3a$, $Pc4$, $Pc5a$–$Pc13a'$ is made operative during subclock I of the operating cycle No. 2 (FIG. 2$b$). During the period of operation of the carry propagation circuits (CPC #1–#8), carry signals produced at outputs K1 to K9 are supplied to carry incorporation circuits (CIC #1–#9) as indicated in FIG. 11$a$. In FIG. 11$b$, the carry signals are provided on a combination of two outputs for each of the carry propagation circuits (CPC #9–#12) provided for respective adder stages #9 to #12, as shown. Accordingly, each of the carry incorporation circuits 26 (CIC #1–#9) for adder stages #1 to #9 is provided with a single input for the respective carry signals K1 to K9 (e.g., carry signal K1 for CIC #1, FIG. 12), and each of the carry incorporation circuits (CIC #10–#12) (e.g., CIC #10, FIG. 13$a$ for adder stage #10) is provided with two inputs for two carry signals (e.g., $kb$ and $kc$ for CIC #10) and an additional input for an additional common carry signal provided by the carry propagation circuit CPC #8 at its output $ka$. The foregoing arrangement has been provided to propagate the carry signals in a minimum number of two subclock time periods, i.e., subclock III of cycle No. 1 and subclock I of cycle No. 2.

In accordance with the foregoing arrangement signal outputs of majority elements $Pc2$ and $Pc3$ for lower order stages #1 and #2 are derived during subclock III of cycle No. 1. These outputs are delayed by majority elements $Pc2a$ and $Pc3a$ to provide carry signals at outputs K2 and K3, which are produced during subclock I of cycle No. 2, when higher order carry signals K4 to K9 are produced. Since the output of element $Pc3$ is available before subclock I of cycle No. 2, the lower order carry signal conditions are available during subclock III of cycle No. 1 to enter into the determination of the carry signals for higher order stages #3 to #12. Accordingly, the output of majority element $Pc3$ is applied to majority elements $Pc4a$ to $Pc9a$, inclusive. As to stages #3 and #4, majority elements $Pc4$, $Pc4'$ and elements $Pc5$, $Pc5'$ provide a delay of the outputs R9$c$–R10$c$ and R9$d$–R10$d$, respectively, to make these outputs available during subclock I of cycle No. 2 when the carry signal output of $Pc3$ is available to enter in the determination of carry signals for stages #3 and #4 during subclock I of cycle No. 2 by majority elements Pc4a and Pc5a, respectively.

In order to consider carry conditions of lower order stages #1 to #4 to determine the carry signal for stage #5, carry propagation circuit (CPC #5) provides majority elements Pc6 and Pc6' having single value inputs connected to outputs R9c–R10c and R9d–R10d in addition to double value inputs for outputs R9e–R10e; and provides majority element Pc6a having an input connected to the output of majority element Pc3. Carry conditions of stages #3, #4 and #5 are made available to carry propagation circuits (CPC #6–#8) by coupling the outputs of majority elements Pc6 and Pc6' to inputs of each of the majority elements Pc7a, Pc8a and Pc9a to enter into the determination of carry signals at outputs K7, K8 and K9. Lower adder stage carry conditions (stages #1 and #2) are provided for by respective inputs connected to the output of majority element Pc3. Outputs R9f–R10f for stage #6, outputs R9g–R10g for stage #7, and outputs R9h–R10h for stage #8 control the state of respective majority elements Pc7–Pc7', Pc8–Pc8' and Pc9–Pc9' in the manner indicated in FIG. 11a. The outputs R9f–R10f of stage #6 and outputs R9g–R10g are applied to inputs of higher order stages as shown to transmit carry conditions of these lower stages to higher order stages as required to determine the carry signals of the higher order stages.

Figure 11A:
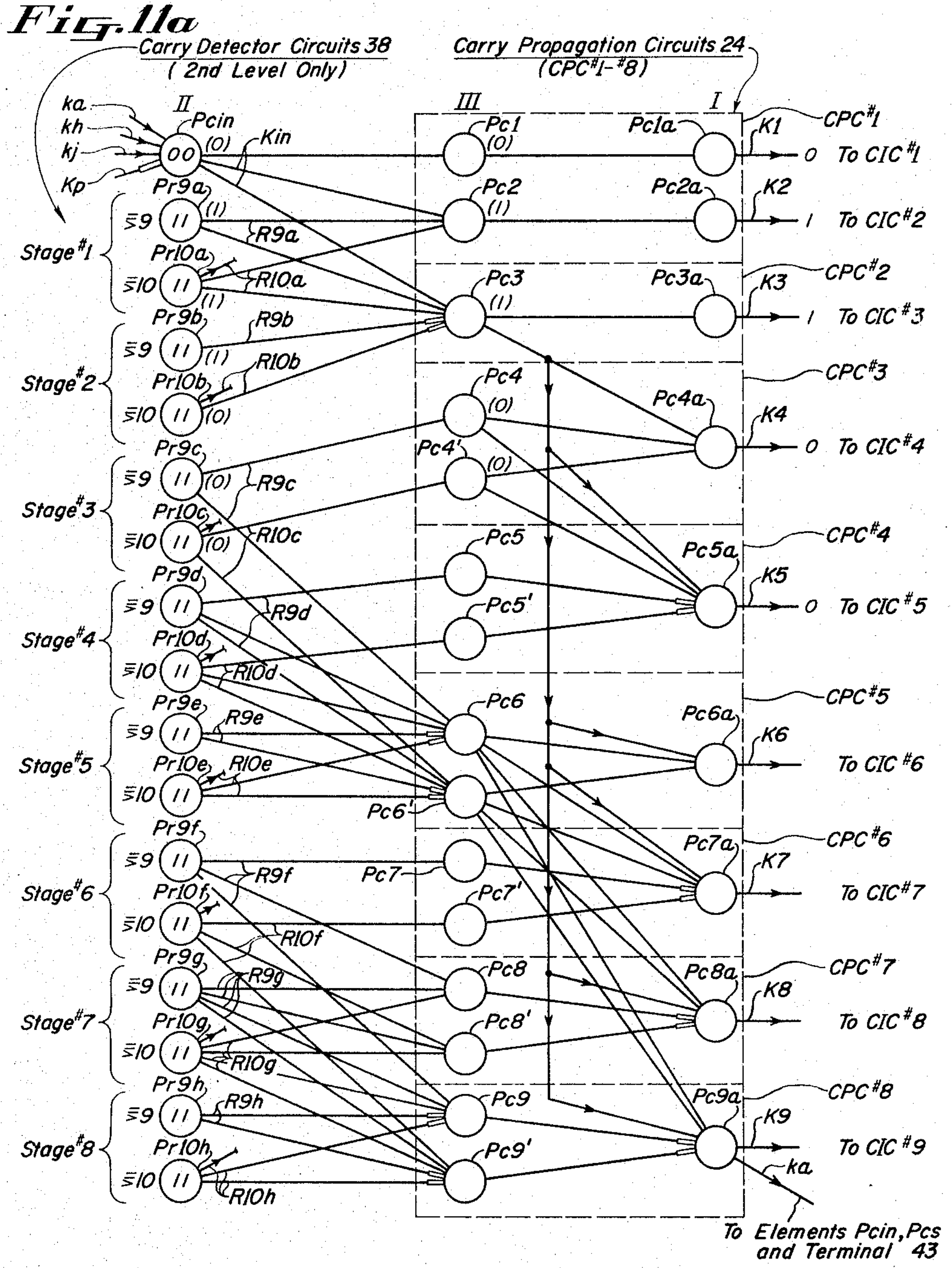
Figure 11B:
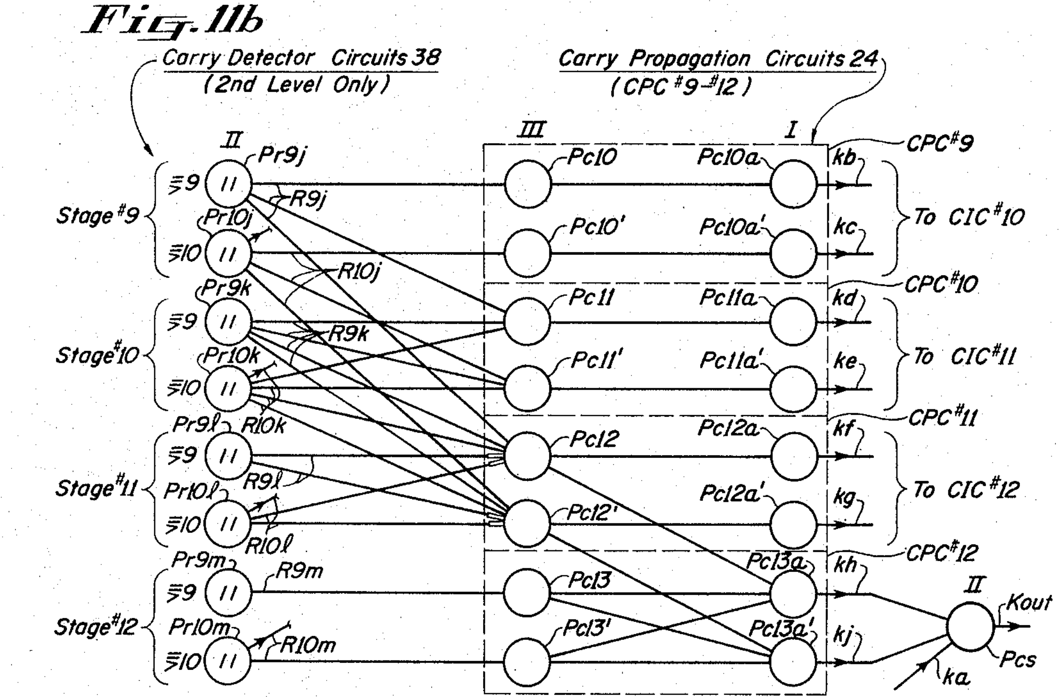
Figure 13A:
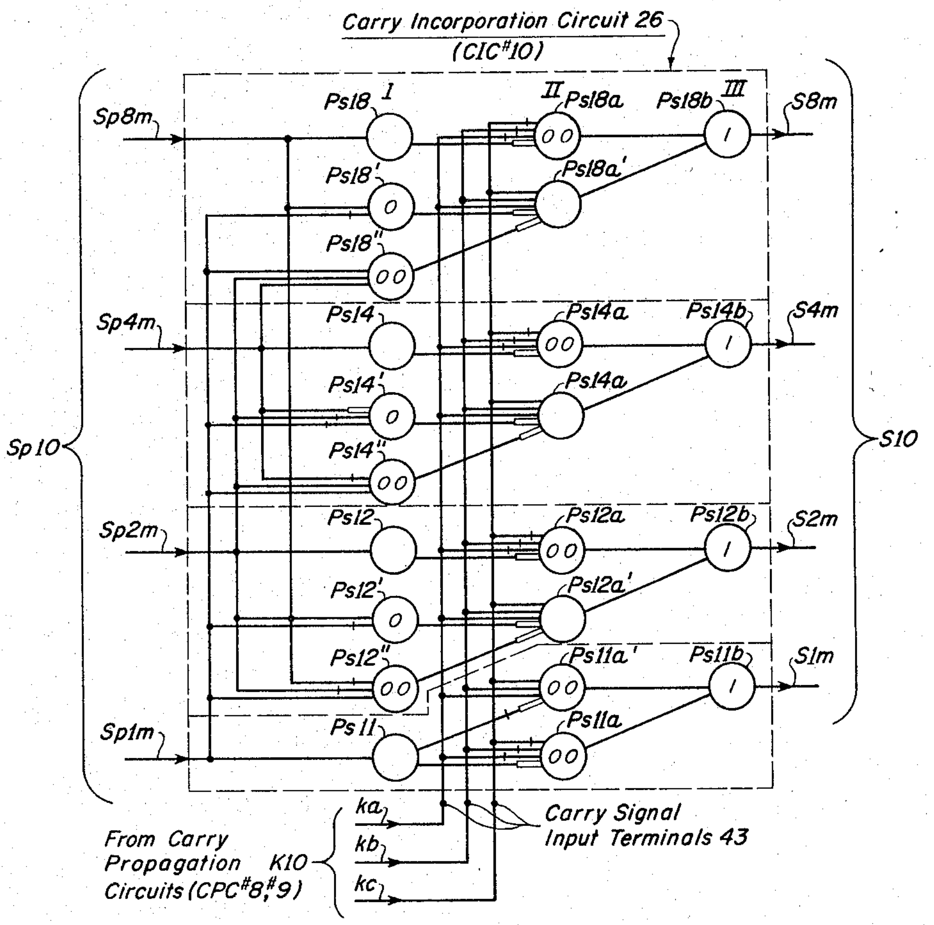

Continuing with the description of the general characteristics of the carry propagation circuits and more particularly higher order carry propagation circuits (CPC #9–#12) shown in FIG. 11b, each of these circuits has two outputs, e.g., outputs kb and kc (CPC #9) which are coupled to carry incorporation circuit (CIC #10) FIG. 13a, along with the output ka of carry propagation circuit (CPC #8) of FIG. 11a. The need for two outputs for each of the carry propagation circuits (CPC #9–#12) follows as a result of the requirement of transmitting carry conditions from a large number (eight) of lower order stages. The networks of majority elements of carry propagation circuits are necessarily limited to a maximum number of stages in the resolution of carry signals within the two subclocks III of cycle No. 1 and subclock I of cycle No. 2 and in order to provide for carry propagation for twelve adder stages, the carry propagation function has been extended into the carry incorporation circuits (CIC #10–#12). For example, carry signal outputs kb, kc, of carry propagation circuit (CPC #10) and carry signal output ka of carry propagation circuit (CPC #8, FIG. 11a) are applied to three carry signal input terminals provided in carry incorporation circcuit (CIC #10, FIG. 13a). These carry signal outputs ka to kg are coupled to carry incorporation circuit majority elements operative during subclock II of cycle No. 2 (e.g., as shown in FIG. 13a) to be combined during subclock II of cycle No. 2 (FIG. 13a). Thus, the plurality of carry signal outputs of each of the carry propagation circuits (CPC #9–#11) is applied to carry incorporation circuits (CIC #10–#12) to produce the sum at outputs (e.g., outputs 51m, 52m, 54m and 58m) at the end of subclock III of cycle No. 2.

Considering now the details of operation of the networks of majority elements of the carry propagation circuits 24 as shown in FIGS. 11a and 11b, the basic network of majority elements employed in the carry propagation circuits is illustrated in FIG. 11a including majority elements Pc2 and Pc3 of carry propagation circuits (CPC #1–#2). This network is repeated throughout the propagation circuits 24 and provides for propagating carry signals derived from the carry detector circuits for adder stages #1 to #12 from lower order stages to higher order stages of the adder stages #1 to #12.

The majority element Pc2 has three single value control inputs coupled to the respective outputs of majority elements Pcin, Pr9a and Pr10a. The majority element Pc3 has three single value inputs coupled to outputs Kin, R9a and R10a of majority elements Pcin, Pr9a and Pr10a, respectively, and two double value inputs coupled to outputs R9b and R10b of majority elements Pr9b and Pr10b, respectively. The operation of this network is best understood by considering the exemplary binary signals provided on the outputs of majority elements Pr9a, Pr10a, Pr9b and Pr10b which are produced by carry detector circuits for adder stages #1 and #2. Both majority elements Pr9a and Pr10a have been placed in the binary "1" state because the partial sum of decimal digits "7" and "5" is equal to or greater than nine (≧9) and ten (≧10). The outputs R9a and R10a couple the "1" bits to both majority elements Pc2 and Pc3. The majority element Pc2 has three control inputs and a majority of two (2 of 3) of these inputs has "1" bits applied thereto by outputs R9a and R10a. Accordingly, the majority element Pc2 is placed in the binary "1" state, as shown, during subclock I of cycle No. 2. The output of majority element Pc2 is coupled to the single control input of majority element Pc2a to place Pc2a in binary "1" state during subclock I of operating cycle No. 2 (FIG. 2b) to provide the carry signal at the output K2 for the carry incorporation circuit (CIC#2) of the next higher order stage (stage #2).

The network of majority elements presently being discussed also includes majority element Pc3 which will now be considered in detail. It is noted that this network forms a part of the next higher order carry propagation circuit (CPC #2). The same outputs Kin, R9a and R10a that are coupled to majority element Pc2 are also coupled to majority element Pc3; the difference in the arrangement being that majority element Pc3 has two double value control inputs in addition to the three single value inputs, as shown. Of the total of seven (3 single value inputs and 2 double value inputs), a majority of four (4 of 7) is required to provide a binary "1" net signal for placing the majority element Pc3 in the binary "1" state. Therefore, the decimal sum "9" (exemplary digits "6" and "3" (FIG. 2a) are applied to stage #2) provides a "1" bit on the output R9b which is coupled to the double value control input of the majority element Pc3. In addition, the outputs R9a and R10a of the next lower stage (stage #1) supply a "1" bit to each of two of the single control inputs of the majority element Pc3. This combination of "1" bits on these three inputs produces a majority weight or value of four binary "1" signals, and, therefore, a net binary "1" signal to majority element Pc3 to place it in the binary "1" state during subclock III of operating cycle No. 1. The "1" bit on the output of majority element Pc3 is coupled to majority element Pc3a to place the latter in a binary "1" state during subclock I of operating cycle No. 2 to provide a carry signal at the output K3.

In general and in addition to the foregoing exemplary operation, the majority element Pc3a is placed in the binary "1" state to provide a carry signal at the output K3 when the sum of the decimal digits applied to stage #2 is equal to or greater than ten (≧10) and is therefore, also greater than nine (≧9) wherein both of the outputs R9b and R10b apply a "1" bit to double value control inputs of the majority element Pc3. Applying a "1" bit to each of these double value inputs produces a majority of four binary "1" signals to place the majority element in a binary "1" state and thereby provide a carry signal at the output K3 during subclock I of operating cycle No. 2.

The foregoing network of majority elements, including elements Pc2 and Pc3, is typical of networks employed repeatedly throughout the carry propagation circuits 24, for example, the network including majority elements Pc4a and Pc5a or Pc6a and Pc7a. Furthermore, this particular majority network arrangement performs the same function at different logical levels in the carry propagation circuits 24 as described in connection with majority elements Pc2 and Pc3, i.e., produces a carry signal for respective ones of two stages in response to inputs indicating a sum equal to or greater than ten (≧10) or a sum equal to nine (=9), and a carry signal produced in the next lower order stage.

Referring now to the network of majority elements including Pc4a and Pc5a, it is seen that a "1" bit on the output of majority element Pc3 indicates a carry signal is being produced at the output K3 and therefore when the partial sum (decimal) of stage #3 is nine (9) (a "1" bit is produced on the output 59c and output of majority element Pc4), a majority of two "1" bit inputs (2 of 3) is provided at majority element Pc4a to place it in the binary "1" state to provide a carry signal on output K4. According to the exemplary addition of decimal digits "3" and "4" provided at the inputs of stage #3 (the partial sum (Sp3) is only seven (7), therefore no carry signal ("0" bit) is produced at the carry output K4. However, when the partial sum (Sp3) of stage #3 is equal to or greater than ten (≧10) and therefore greater than nine (≧9), "1" bits are coupled to both majority elements Pc4 and Pc4' from outputs R9c and R10c, respectively, to place both elements Pc4 and Pc4' in a binary "1" state to provide a majority of two "1" bit inputs to majority element Pc4a. The binary "1" net signal at majority element Pc4a places it in a binary "1" state to provide a carry signal at the carry output K4.

As to majority element Pc5a of this network including elements Pc4a and Pc5a, it is clear that a partial sum (decimal of stage #4 which is equal to or greater than ten (≧10) will produce "1" bits on outputs R9d and R10d to place both majority elements Pc5 and Pc5' in a binary "1" state, and the output of elements Pc5 and Pc5' will provide a majority of four (4 of 7) at a double value inputs of majority element Pc5a. Accordingly, a binary "1" net signal is produced to place majority element Pc5a in a binary "1" state to provide a carry signal at the carry output K5. However, when the partial sum (decimal) of stage #4 is equal to nine (9) and a carry condition exists in stage #3 (producing a carry signal on output K3), "1" bits will be provided on at least two of the three single value inputs to majority element Pc5a by either one or both of the following: (1) "1" bit outputs from elements Pc4 and Pc4' (when the partial sum Sp3≧10), or (2) "1" bit outputs from elements Pc3 and Pc4 (when the partial sum *Sp*3=9 and the stages lower than stage #3 produce a carry signal K3 as indicated by a "1" bit on the output of Pc3).

In the view of the foregoing description of FIG. 11a, it is apparent that certain operational functions are provided by particular types of majority element networks consisting of a single majority element which can be used singly or combined, to provide a desired sequence of operations. A majority element (e.g., Pc4a) has three single value inputs which respond to carry signal conditions in only the next lower adder stage (e.g., stage #2) and its own stage (e.g., stage #3). A majority element (e.g., Pc5a) has three single value inputs and two double value inputs, which respond to carry signal conditions in the next two lower order adder stages (e.g., stages #2 and #3) by the three signal value inputs and its own stage (e.g., stage #4) by two double value inputs. Higher order stages require carry signal information from more lower order stages, therefore the majority element networks for the higher order stages become more complicated than lower order stages as evidenced by the number of majority elements in the carry propagation circuits (CPC #3–#8, FIG. 11a and CPC #9–#12, FIG. 11b) and the number of inputs to the majority elements in the carry propagation circuits (CPC #4–#8, FIG. 11a and CPC #11, FIG. 11b). The carry propagation circuit (CPC #5), for example, has majority elements Pc6 and Pc6', each having three single and two double value inputs. Majority element Pc6 has single value inputs connected to outputs R9c, R9d and R10d and double value inputs connected to respective outputs R9e and R10e. A combination of "1" bits on outputs R9c, R9d and R9e provides a majority of four (4 of 7) to place the majority element Pc6 in a binary "1" state. The combination of "1" bit outputs from majority elements Pc6 and Pc3 applied to inputs of majority element Pc6a, as shown, provides a majority of two to place majority element Pc6a in a binary "1" state to provide a carry signal output K6. The operation performed is as follows: when each of the partial sums (decimal) of stages #3, #4 and #5 is nine (9) and a carry signal is produced in carry propagation circuit (CPC #2), as indicated by "1" bit output of majority element Pc3, then a carry signal must be produced at carry signal output K6. Simply stated, carry signals are propagated from stage #2 to stated #6. In order to provide for a carry signal output K6 when the partial sum of stage #4 is equal to or greater than ten (≧10) and the partial sum of stage #5 is nine (9), "1" bits at outputs R9d, R10d and R9e are coupled to inputs of both majority elements Pc6 and Pc6' to provide a majority of four at both elements Pc6 and Pc6' to place both elements in a binary "1" state. The "1" bit outputs of these elements Pc6 and Pc6' which are applied to the inputs of majority element Pc6a provide a majority of two to place element Pc6a in a binary "1" stage to provide a "1" bit at carry signal output K6. As for partial sums equal to or greater than then (≧10) of stage #5, it is seen that double value inputs of each of the majority elements Pc6 and Pc6' are coupled to outputs R9e and R10e, respectively, and a "1" bit on each output places both majority elements Pc6 and Pc6' in a binary "1" state. The "1" bit outputs of majority elements Pc6 and Pc6' provide a binary "1" net signal for majority element Pc6a to provide a "1" bit on the carry signal output K6.

Continuing the description of FIG. 11a, and more particularly the operation of carry propagation circuits (CPC #6–#8), each of the majority elements Pc7a, Pc8a and Pc9a has three single value inputs and two double value inputs. Two of the single value inputs of each of majority elements Pc7a, Pc8a and Pc9a are coupled to the outputs of Pc6 and Pc6' and the third single value input is connected to the output of element Pc3. The two double value inputs for each of the majority elements Pc7a, Pc8a and Pc9a are connected to majority elements Pc7 and Pc7', Pc8 and Pc8', and Pc9 and Pc9', respectively, as shown.

The operation of majority element Pc7a will be considered first. When each of stages #3, #4, #5 and #6 has a partial sum of nine (9), majority element Pc6 provides a "1" bit output that is coupled to a single value input of majority element Pc7a, as shown. Also, majority element Pc7 couples a "1" bit to a double value input of majority element Pc7a, as shown. The remaining single value input of majority element Pc7a is coupled to the output of majority element Pc3. Therefore, when each of the stages #3, #4, #5 and #6 has partial sums of nine (9) and a carry signal is produced in stage #2 to provide a "1" bit output from majority element Pc3, a majority of four and, therefore, a binary "1" net signal is produced to place majority element Pc7a in a binary "1" state to provide a "1" bit on the carry signal output K7. For other carry conditions of stages #3, #4, or #5 resulting in a "1" bit at carry signal output K6, both majority elements Pc6 and Pc6' are placed in the binary "1" state to provide "1" bit outputs which are both coupled to each of the majority elements Pc7a, Pc8a and Pc9a. Whenever both majority elements Pc6 and Pc6' are placed in a binary "1" state and the partial sum produced in stage #6 is equal to nine (9), the majority element Pc7 is placed in a binary "1" state to provide a majority of four and a binary "1" net signal in the majority element Pc7a to produce a "1" bit on the carry signal output K7. The operation of carry propagation circuits (CPC #8–#9) should be clear from the description of carry propagation circuit (CPC #6). However, it should be noted that binary states of majority elements Pc8 and Pc8' of stage #7 depend in part upon outputs R9*f* and R10*f* of stage #6 as well as outputs R9*g* and R10*g* and the binary states of majority elements Pc9 and Pc9′ of stage #8 depend in part upon outputs R9*f*–R10*f* and R9*g*–R10*g* of stages #6 and #7 as well as R9*h* and R10*h*. Thus, the partial sums producing carry signals or propagating a carry signal in stages #6 to #9 are provided for by coupling of the outputs of R9*f*–R10*f* and R9*g*–R10*g* from lower order stages #6 and #7, respectively, to higher order stages #7 and #8.

Referring now to FIG. 11*b* and the details of operation of carry propagation circuits (CPC #9–#12), a partial carry signal is produced at each of the two outputs provided for each of the carry propagation circuits (CPS #9–#12) as shown.

Carry propagation circuit (CPC #9) provides partial carry signals at outputs *kb* and *kc* by merely delaying the outputs R9*j* and R10*j* during subclock III of cycle No. 1 and subclock I of cycle No. 2. Majority elements Pc10 and Pc10′ store the outputs R9*j* and R10*j*, respectively, during subclock III of cycle No. 1; and majority elements Pc10*a* and Pc10*a*′ store the signal outputs during subclock I of cycle No. 2 to provide partial carry signals at outputs *kb* and *kc*, respectively.

Carry propagation circuit (CPC #10) provides partical carry signals at outputs *kd* and *ke* and includes majority elements Pc11*a* and Pc11*a*′ which store the outputs of majority elements Pc11 and Pc11′, respectively, during subclock I of cycle No. 2. The majority elements Pc11 and Pc11′ have inputs connected to both outputs R9*k* and R10*k* which place both majority elements Pc11 and Pc11′ in a binary "1" state when the partial sum in stage #10 is equal to or greater than ten (≧10). The majority elements Pc11 and Pc11′ also have inputs connected to outputs R9*j* and R10*j*, respectively, which will place both majority elements Pc11 and Pc11′ in a binary "1" state when the partial sum in stage #9 is equal to or greater than ten (≧10), and the partial sum in stage #10 is equal to nine (9).

In carry propagation circuit (CPC #11), majority elements Pc12*a* and Pc12′ merely store the outputs of majority elements Pc12 and Pc12′ to provide the partial carry signals at outputs *kf* and *kg*, respectively, during subclock I of cycle No. 2. The operation of majority elements Pc12 and Pc12′ is similar to the operation of majority elements Pc6 and Pc6′ or Pc9 and Pc9′ previously described in the description of the carry propagation circuit (CPC #5) or (CPC #8), respectively. The inputs to majority elements Pc12 and Pc12′ provide for partial carry signals resulting from partial sums equal to or greater than ten (≧10) in stage #11, and carry propagation from stages #9 and #10 to stage #12.

The last carry propagation circuit (CPC #12) provides partial carry signals at outputs *kh* and *kj* for partial carries resulting from partial sums equal to or greater than ten (≧10) in stage #12, and propagation of partial carry signals from lower order stages #9, #10 and #11 to stage #12. Since the adder of the present invention, as shown, comprises only twelve stages, the partial carry signal outputs *kh* and *kj* are coupled to inputs of majority element Pc*s*. The majority element Pc*s* provides for a storage of overflow carry signals during subclock II of cycle No. 2 and provides a carry signal output K*out*. The carry output *ka* is coupled to majority element Pc*s* to provide for carry propagation thereto from stages #1 to #8.

As to the network of majority elements of carry propagation circuit (CPC #12), majority elements Pc13*a* and Pc13*a*′ have inputs coupled to the outputs of majority elements Pc12 and Pc12′, respectively, to provide for carry propagation from lower order stages #9 to #11. The other inputs of majority elements Pc13*a* and Pc13*a*′ are coupled to majority elements Pc13 and Pc13′ to provide for a partial sum equal to or greater than ten (≧10) for producing partial carry signals at outputs *kh*, *kj* and a partial sum equal to nine (9) which will combine with the inputs coupled to outputs of majority elements Pc12 and Pc12′ to produce partial carry signals at outputs *kh*, *kj*.

CARRY INCORPORATION CIRCUIT (CIC #1) (FIG. 12)

Figure 12:
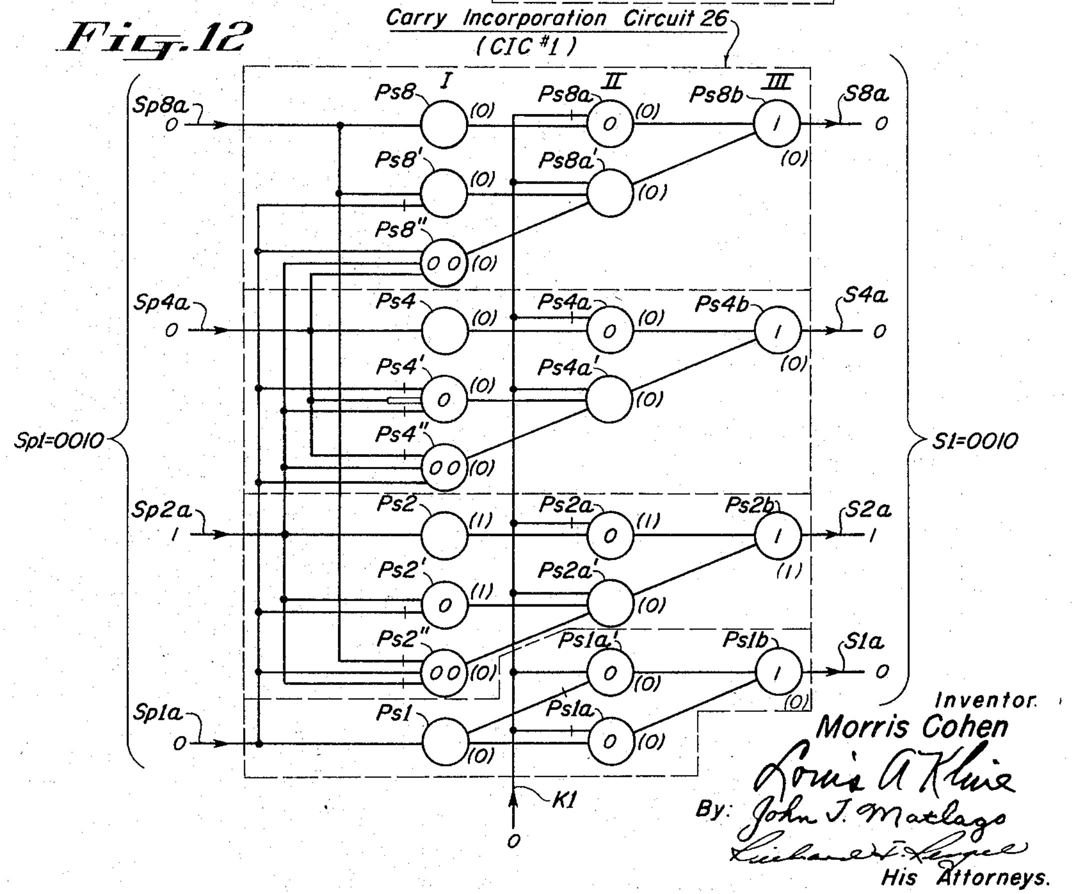

Referring now to FIG. 12, the operation of the carry incorporation circuit (CIC #1) will be described. This circuit is typical of carry incorporation circuits for lower adder stages #1 to #9. This circuit differs from higher adder carry incorporation circuits (e.g., CIC #10, FIG. 13*a*) in that carry incorporation circuits (CIC #1–#9) for lower adder stages provide for including a single carry signal (e.g., carry signal K1 for circuit CIC #1), whereas higher adder carry incorporation circuits (CIC #10–#12) provide for three partial carry signals (e.g., partial carry signals *ka*, *kb*, and *kc* for circuit CIC #10).

Considering now the details of operation of the circuits shown in FIG. 12, the partial sum outputs S*p*1*a*, S*p*2*a*, S*p*4*a* and S*p*8*a* of partial adder circuits 30, 32, 34 and 36 (FIG. 3), respectively, provide the inputs for carry incorporation circuit 26 (CIC #1); and the output K1 of carry propagation circuit (CPC #1) provides the single carry signal input. According to the exemplary addition in stage #1 of decimal digits "7" and "5," the partial sum (mod 10) S*p*1 is "2" (decimal) or "0010" in binary-coded decimal form, and the carry signal output K1 is a binary "0." Accordingly, the sum S1 is "0010" or "2" (decimal) since no carry is added to the partial sum (S*p*1).

As shown in FIG. 12, individual networks of majority elements are provided for each binary digit of the partial sum (mod 10) S*p*1 and the partial sum outputs S*p*1*a*, S*p*2*a*, S*p*4*a* and S*p*8*a* are distributed to these networks to provide for carry incorporation and the sum S1 at respective outputs S1*a*, S2*a*, S4*a* and S8*a*. The letters P*s* included in a reference character designate a majority element in the carry incorporation circuits 26. Considering the majority network for the lowest order binary digit of the partial sum (mod 10) S*p*1 first, majority element P*s*1 stores the "0" bit applied thereto during subclock I of cycle No. 2 to provide a "0" bit at its outputs which are coupled to one of the control inputs of each of the majority elements P*s*1*a* and P*s*1*a*′. As shown, each of majority elements P*s*1*a* and P*s*1*a*′ has one other input (excluding the constant "0" inputs) which is coupled to the carry signal output K1 for incorporation of the carry signal in the sum output S1*a*. The network including only majority elements P*s*1, P*s*1*a*, P*s*1*a*′, and P*s*1*b* comprises an exclusive OR circuit arrangement (logical operator) to provide a "1" bit output only when a single "1" bit is provided by combined partial sum outputs S*p*1*a* and carry signal output K1. Accordingly, exemplary "0" bit inputs provided by outputs S*p*1*a* and K1 provide a "0" bit at output S1*a*.

In carry incorporation circuit (CIC #1, FIG. 12) the network for the next higher order bit ($2^1$) of stage #1, the "1" bit at the output S*p*2*a* is applied to majority elements P*s*2, P*s*2′ and P*s*2″ to produce a "1" bit at outputs of elements P*s*2 and P*s*2′ that are coupled to inputs of majority elements P*s*2*a* and P*s*2*a*′ along with the "0" bit carry signal output K2 as shown. Since the carry signal output K1 is a binary "0," the "1" bit on output S*p*2*a* is coupled through majority elements P*s*2, P*s*2*a* and P*s*2*b* to provide a "1" bit on the sum output S2*a*. Whenever a "1" bit is present on carry signal output K1, majority elements P*s*2*a* is placed in the binary "0" state by the inversion of the carry signal coupled to P*s*2*a* from output K1. However, in order to provide for sums including a carry signal, majority element P*s*2*a*′ is placed in a binary "1" state by "1" bit inputs supplied from carry signal output K1 to outputs of majority elements P*s*2′ or P*s*2″. Majority element P*s*2′ is placed in a binary "1" state by partial sums "0010" (decimal 2) or "0010" (decimal 6) and majority element P*s*2″ is placed in a binary "1" state by partial sums "0001" (decimal 1) or "0101" (decimal 5). These partial sums require a "1" bit at output S*p*1*a* when increased by one (a binary "1" carry signal) to produce sums "0011" (3) or "0111" (7) and "0010" (2) or "0110" (6), respectively. Thus, sums produced in the presence of a binary "1" carry signal are provided for by the "1" bit output of majority element P*s*2*a*′ which places majority element P*s*2*b* in a binary "1" state to provide a "1" bit at output S2*a*. It should be noted that the input to P*s*2″ which is connected to partial sum output S*p*8*a* is inverted to prevent majority element P*s*2″ from being placed in a binary "1" state whenever the partial sum (mod 10) is "1001" (9). In the previous description of the carry detector and propagation circuits, a partial sum (9) is detected for propagation of carry signals. In the carry incorporation circuit 26, this partial sum (9) is detected to prevent majority element P*s*2 from being placed in a binary "1" state and thereby prevent a non-binary-coded decimal configuration "1010" (10) from occurring at the output S1.

In the foregoing network of majority elements, elements P*s*2′ and P*s*2″ are mutually exclusive, i.e., both elements P*s*2′ and P*s*2″ cannot be placed in the binary "1" state in subclock I of cycle No. 2. Thus, the majority element P*s*2′ can only be placed in the binary "1" state by a "1" bit carry signal K1 and a "1" bit at the output of either majority element P*s*2′ or P*s*2″. The other individual networks of majority elements for producing sum outputs S1*a*, S4*a*, and S8*a* also have this mutual exclusive feature discussed specifically with reference to the network for sum output S2*a*.

In addition, the network of majority elements P*s*4, P*s*4′, P*s*4″, P*s*4*a*, P*s*4*a*′ and Ps4*b* for sum output S4*a* is otherwise operative in a similar manner to the network for sum output S2*a*. In the absence of a binary "1" carry signal on output K1, the partial sum output S*p*4*a* is coupled to sum output S4*a*. In the presence of a binary "1" carry signal on output K1 together with inputs placing majority element P*s*4′ in a binary "1" state for partial sums of four (4), five (5) or six (6) a "1" bit is produced at partial sum output S*p*4*a* and a "0" bit is produced at either or both partial sum outputs S*p*1*a* and S*p*2*a*. In the presence of a "1" bit carry signal and absence of inputs to place element P*s*4′ in the binary "1" state, majority element P*s*4″ can be placed in a binary "1" state for partial sum of three (3) by the "1" bits applied to its inputs from partial sum outputs S*p*1*a* and S*p*2*a* and a "0" bit applied to its inverted input from partial sum output S*p*4*a*.

Similarly, the sum output S8*a* is provided by a network of majority elements P*s*8, P*s*8′, P*s*8″, P*s*8*a*, P*s*8*a*′ and P*s*8*b*. In the absence of a "1" bit carry signal at output K1, the partial sum output is coupled to the sum output S8*a*, via elements P*s*8, P*s*8*a* and P*s*8*b*. In the presence of a "1" bit carry signal, majority element P*s*8*a*′ can be placed in a binary "1" state to provide a "1" bit at the sum output S8*a* by either element P*s*8′ or P*s*8″. Majority element P*s*8*a*′ is placed in a binary "1" state by a "1" bit carry signal and a "1" bit output of P*s*8′ which is placed in a binary "1" state by a partial sum of eight (8) formed by a "1" bit on the partial sum output S*p*8*a* and a "0" bit on the partial sum output S*p*1*a*. Majority element P*s*8*a*′ is placed in a binary "1" state by a "1" bit carry signal and a "1" bit output of P*s*8″ which is placed in a binary "1" state by a partial sum of seven (7) by "1" bits on the partial sum outputs S*p*1*a*, S*p*2*a* and S*p*4*a*. Accordingly, either partial sums seven or eight, as described, and a "1" bit carry signal, produce a "1" bit on the sum output S8*a*.

In view of the foregoing description of the typical carry incorporation circuit (CIC #1), it is clear that the sum S1 includes the single carry signal, if any, on the carry signal output K1. The exemplary sum S1 "0010" (decimal digit 2) is for stage #1 and the carry incorporation circuits (CIC #2–#9) are identical in their circuit arrangements, to provide sums S2 to S9 including the single carry signal, if any, for stages #2 to #9.

CARRY INCORPORATION CIRCUIT (CIC #10)

The carry incorporation circuit (CIC #10) shown in FIG. 13*a* is typical of carry incorporation circuits (CIC #10–#12) providing for three partial carry signal outputs supplied by carry propagation circuits (CPC #8–#11, FIGS. 11*a* and 11*b*), e.g., outputs *ka, kb,* and *kc* which together are designated as carry signal output K10. The carry incorporation circuit (CIC #10) is identical in construction and operation as the carry incorporation circuit (CIC #1), shown in FIG. 12, except for the provision of majority elements having inputs for and connected to partial carry signal outputs *ka, kb* and *kc* which are coupled into the carry incorporation circuit (CIC #10) at carry signal input terminals 43. These majority elements in FIG. 13*a* differ from corresponding majority elements connected to carry output K1, as shown in FIG. 12, in that the former have seven control inputs (including constant control inputs) to provide for the three carry sigal outputs *ka, kb* and *kc*. Otherwise, the operation of these circuits is substantially the same. In FIG. 12, a single carry signal from output K1 is coupled to the majority elements operative during subclock II of cycle No. 2, consequently, majority elements, each having only three inputs, are required to receive the various inputs shown. In FIG. 13*a*, seven inputs are required for each majority element to receive the three partial carry signals and the various other signals. It should be noted however that a "1" bit carry signal K10 is indicated by a majority on only two "1" bit partial carry signals at two of the three outputs *ka, kb* and *kc*.

Accordingly, any combination of "1" bits on at least two of the outputs *ka, kb* and *kc* will, in the presence of other required "1" bit inputs, provide a binary "1" net signal to place any one or combination of majority elements P*s*11*a*′ P*s*12*a*′, P*s*14*a*′, and P*s*18*a*′, in a binary "1" state. Also, any combination of "0" bits on at least two of the ouputs *ka, kb* and *kc* will be inverted to provide at least two "1" bits at inputs to majority elements P*s*11*a*, P*s*12*a*, P*s*14*a* and P*s*18*a*. Therefore, when "0" bits are present on *ka, kb* and *kc,* and a "1" bit is applied to any one or more of the double value inputs of P*s*11*a*, P*s*12*a*, P*s*14*a* and P*s*18*a*, they will be placed in a binary "1" state.

Figure 13B:
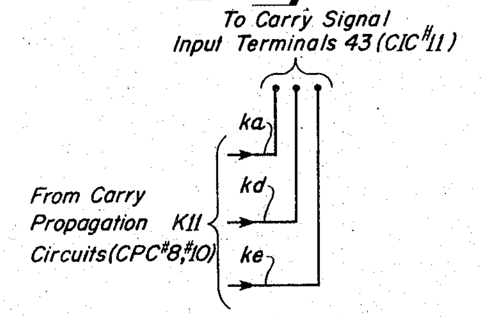
Figure 13C:
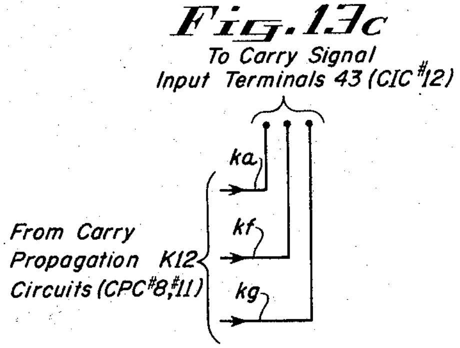

In view of the foregoing, it should be clear that partial carry signals (at outputs, *ka, kb* and *kc*) will be incorporated with partial sum signals (at outputs S*p*1*m*, S*p*2*m*, S*p*4*m* and S*p*8*m*) to produce the sum S1 and sum signals at carry incorporation circuit outputs S1*m*, S2*m*, S4*m* and S8*m*, respectively, for adder stage #10. Also, carry incorporation circuits (CIC #11–#12) will produce sums S11 and S12 for adder stages #11 and #12, respectively. In FIG. 13*b*, only partial carry signal outputs *ka, kd* and *ke* (K11) have been shown along with connections to carry signal input terminals 43 for carry incorporation circuit (CIC #11), and in FIG. 13*c*, only the partial carry signal outputs *ka, kf* and *kg* (K12) have been shown, along with connections to carry signal input terminals 43, for carry incorporation circuit (CIC #12). Carry signals on these outputs are incorporated with partial sums applied to the carry incorporation circuits (CIC #11 and #12) respectively (not shown) to provide sums S11 and S12 for stages #11 and #12.

In the foregoing description of the preferred embodiment of the parallel adder of the present invention, the details of operation thereof have been set forth for parallel addition of the augend (e.g., 367) and addend (e.g., 435) to produce the sum (e.g., 802), as shown in block diagram in FIG. 1. Having completed the description of the parallel adder of the preferred embodiment, a modification of the circuits for enabling them to operate as a serial decimal adder will next be described.

SERIAL DECIMAL ADDER

Figures 14, 15A, 15B:
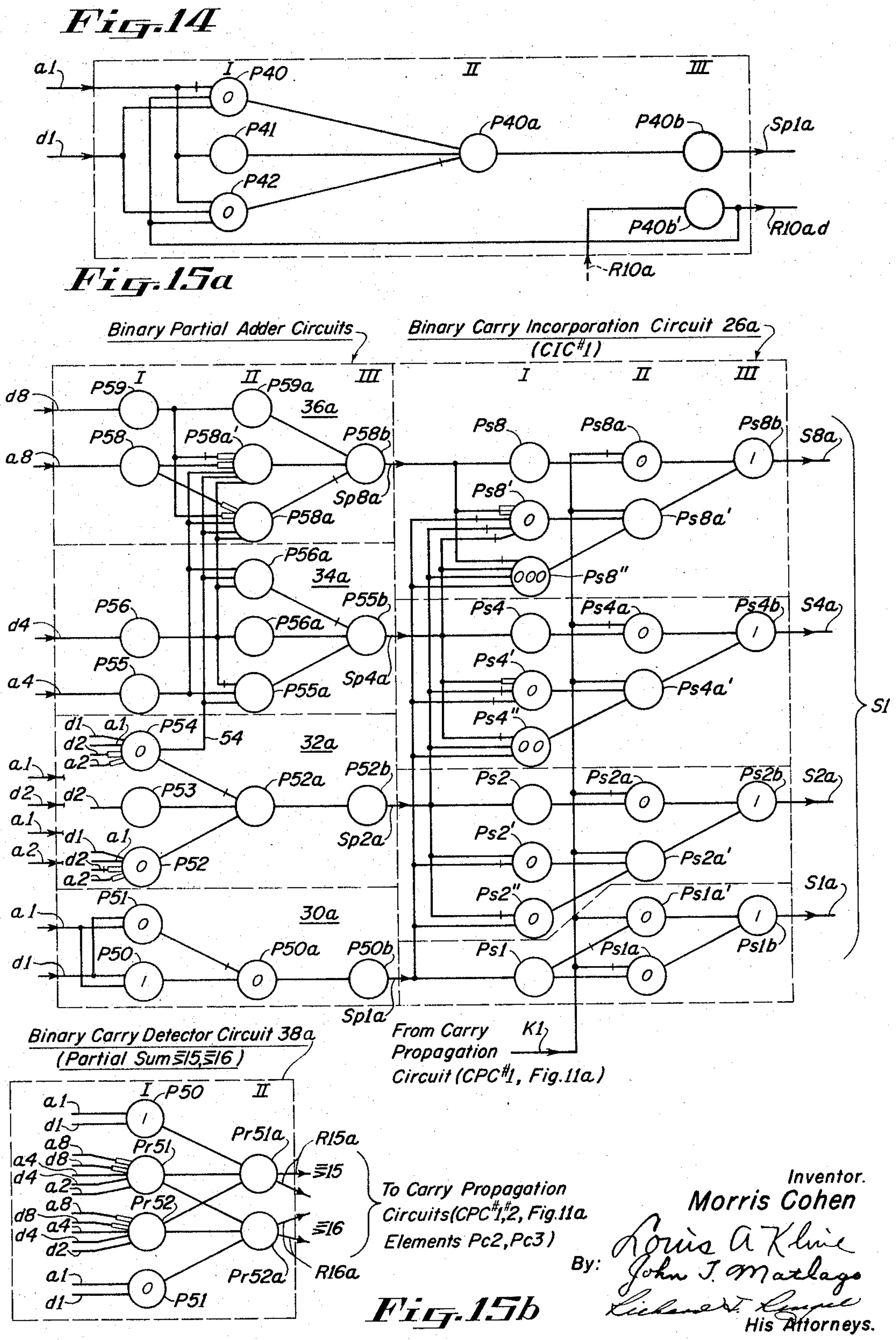

An alternate preferred embodiment of the present invention comprises a decimal, serial adder which consists of a single decimal unit, e.g., decimal unit #1 as shown in FIG. 3, described supra, with slight modifications primarily to the partial adder circuit $2^0$ (of FIG. 6), as shown in FIG. 14.

Accordingly, the pair of least significant decimal digits of the augend and addend are added in the first operating cycle (e.g., cycle No. 1), then the higher order pairs of decimal digits are added in serial order in subsequent operating cycles, until the highest order pair of digits have been added. It should be noted that the number of operating cycles is equal to the number of digits, e.g., twelve. It should be further noted that serial addition of a pair of decimal digits can be performed by the circuits in a single operating cycle, since it is not necessary to propagate the carry during the addition, as required by a parallel adder. Rather, as each pair of digits is added, the decimal carry, if any, resulting from the immediately preceding addition of digits is delayed and made available for inclusion with the addition of the following pair of digits. Thus, in binary-coded decimal form, the two corresponding sets of four bits of each pair of decimal digits are applied in parallel to respective adder circuits 30, 32, 34 and 36 along with the carry signal output R10*a* (FIG. 3) to perform serial addition of the decimal digits in each operating cycle.

In order to provide the decimal carry signal output R10*a* during each operating cycle, the two corresponding sets of bits are applied to the carry detector circuit 38 to detect a partial sum equal to or greater than ten (≧10). (Note that R*9a* is not required in the serial adder.) A decimal carry produced during an operating cycle is applied to the adder circuits 30, 32, 34 and 36 in the immediately succeeding operating cycle to be incorporated in the next higher decimal order of the sum. Accordingly, the serial decimal adder circuit consists only of adder circuits 30 (FIG. 14), 32 (FIG. 7), 34 (FIG. 8), and 36 (FIG. 9) and a carry detector circuit 38 (FIG. 10).

The serial adder $2^0$ binary circuit (FIG. 14) together with other binary order circuits shown in FIGS. 7 to 9, have inputs for receiving the decimal carry signal produced in the carry detector circuit during addition of the previous lower order significant bits of each of the binary-coded decimal digit sets of the augend and addend. Thus, a binary-coded decimal sum digit is obtained at the output S*p*1 (FIG. 3) at the end of each operating cycle. It should be noted that for the serial decimal adder embodiment, the output S*p*1 is the final decimal stage sum, because of modifications made to the inputs of elements P10, P12 and P02 of FIGS. 7 to 10 to account for the decimal carry, as will be described subsequently. Also, it should now be clear that an addition period for a pair of decimal digits is the same as an operating cycle consisting of one period of subclock I, II and III since the operating cycle for and the functions of carry propagation and carry incorporation are not required to provide sums in the serial adder.

In FIG. 14, the serial adder $2^0$ binary order circuit is shown to comprise a network of majority elements having three inputs *a*1, *d*1, and an input connected to delayed decimal carry output R10*a* as produced by the carry detector circuit of FIG. 10. The inputs *a*1 and *d*1 are provided for the lowest order bits of the two sets of binary-coded decimal bits of the augend and addend digits, respectively, and the input connected to carry output R10*ad*, is provided for the carry signals from the addition of the next lower order digits. The delayed carry output R10*ad* is also coupled to the $2^1$, $2^2$ and $2^3$ binary orders of the serial adder; and also back to the carry detector circuit of FIG. 10. Thus, for example, a "1" bit is produced on the output S*p*1*a* only when a "1" bit is present on an odd number (1 of 3) of the inputs *a*1, *d*1 or R10*ad* of the circuit in FIG. 14. The majority element P40*b'* stores the output R10*a* during subclock III to provide the carry signal at output R10*ad* at the beginning of subclock I.

As shown, signals applied to the input *a*1, of majority element P40, are inverted and a "1" bit applied to input *a*1 is effective to apply a "0" bit control signal to element P40. A binary "1" net signal is provided which places majority element P40 in a binary "1" state by a "1" bit on input *d*1 and output R10*ad*; or a "1" bit applied on either output R10*ad* or on input *d*1 and a "0" bit applied to input *a*1. Majority element P41 merely stores (delays) the binary signal applied to input *a*1. Majority element P42 is placed in a binary "1" state by a majority of at least two "1" bits applied to at least two of the inputs *a*1, *d*1 and at output R10*ad*. Majority element P40 is operative during subclock II and is responsive to "1" bits applied to two of its inputs to place it in a binary "1" state. Note, however, that the output of majority element P42 is inverted. Therefore, a majority necessary to place majority element P40*a* in a binary "1" state comprises "1" bits on outputs of elements P40 and P41, or a "0" bit on the output of P42 and a "1" bit on at least one of the outputs of majority elements P40 and P41. Majority element P40*b*, operative during subclock III, merely stores the output of element P40*a* during subclock III to provide the sum output S*p*1*a* during subclock III. It should be noted that outputs S*p*1*a*, S*p*2*a*, S*p*4*a* and S*p*8*a* are sum outputs when used in the serial adder of the alternate embodiment and not partial sums as in the parallel adder of the preferred embodiment.

Referring now in detail to the remaining adder circuits 32, 34 and 36 for the serial adder; these circuits are substantially the same as shown in FIGS. 7, 8 and 9, the only difference being that the carry signals are applied to certain ones of the constant control inputs instead of constant "0" binary signals, i.e., as indicated by the zero (0) in the circles representing the majority elements. Accordingly, in adder circuit 32, FIG. 7, carry signals on outputs R10*ad* (FIG. 14) are substituted for constant binary "0" signals at the respective control inputs of majority elements P10, P12 and P02 and "0" or "1" bit carry signals on outputs R10*ad* are applied to each of the majority elements P10, P12 and P02. As before, when binary "1" carry signals are produced on outputs R10*a*, a sum equal to or greater than ten (≧10) was detected by carry detector circuit 38 (FIG. 10) in the preceding operating cycle. In adder circuit 34, FIG. 8, the "0" or "1" bit carry signals at output R10*ad* are applied to the majority elements P02 and P12 instead of the constant binary "0" signals. In the adder circuit 36, FIG. 9, the carry signal output R10*ad* is also applied to the majority elements P12 and P02 instead of the constant binary "0" signals. In the carry detector circuit 38, FIG. 10, the carry signal output R10*ad* is applied to majority element P02 instead of the constant binary "0" signal.

In view of the foregoing discussion of the serial decimal adder embodiment of the present invention, it is seen that the decimal unit #1 (FIG. 3) provides for serial decimal operation instead of parallel decimal operation. Also, it is apparent that the outputs R*9a* are not necessary in the serial adder and thus the majority elements P01 and P*r9a* in circuit 38 need not be provided for this embodiment.

Figure 15C:
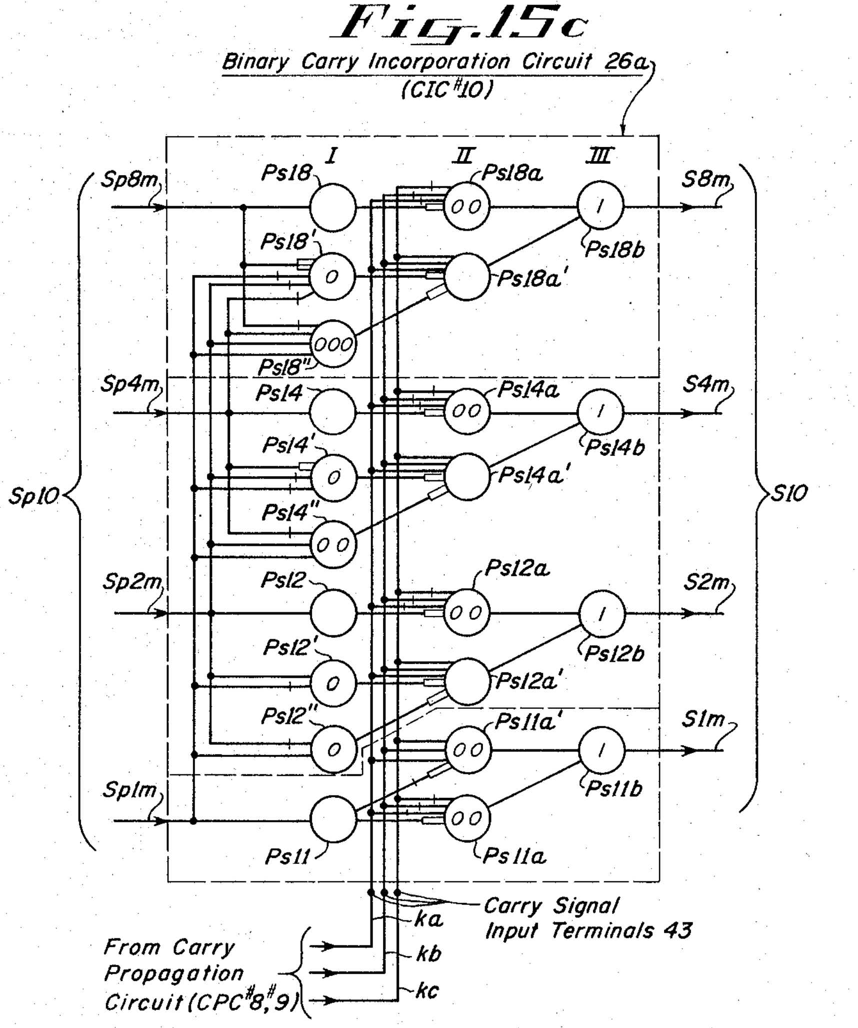

PARALLEL BINARY DIGIT ADDER (FIGS. 15*a*, 15*b*, AND 15*c*)

A second alternate embodiment of the present invention is directed to a parallel binary adder in which binary signals applied to the input of the adder and binary signals produced at the output of the adder are in regular binary notation. As shown in FIGS. 15*a*, 15*b* and 15*c*, circuits of the binary adder have been indicated by reference characters corresponding to those of the decimal adder of the preferred embodiment, e.g., as shown in FIG. 3. The binary adder circuits are considerably simpler than the corresponding circuits of the decimal adder as is evident from FIGS. 15*a*, 15*b* and 15*c*.

In accordance with the present invention as disclosed by the parallel binary digit adder of the alternate embodiment, first and second sets of four binary signals of the augend and addend, respectively, are being operated upon in a similar manner to binary-coded decimal digit signals. Thus, instead of handling each pair of binary signals separately, two sets of four binary signals are operated upon together and, in order to show the relationship to corresponding circuits of the parallel decimal adder 20 of the preferred embodiment, the circuits of the binary adder for adding two sets of four binary signals are referred to hereinafter as a stage, i.e., stage #1 for least significant sets, stage #2 for the next higher order sets, etc. This terminology, while differing somewhat from conventional terms used for binary circuits is extremely helpful in establishing the understanding of the parallel binary digit adder and the corresponding relationship existing between its circuits as shown in FIGS. 15*a*, 15*b* and 15*c* and those circuits of the parallel decimal adder of the preferred embodiment. Further, it will be seen from the description that follows that not only are corresponding circuits of the parallel decimal and binary adder very similar but the binary adder uses the same carry propagation circuits 24 (FIGS. 11*a* and 11*b*) used by the parallel decimal adder.

Continuing now with the description of the operation of the parallel binary adder shown in FIGS. 15*a*, 15*b* and 15*c*, this adder provides the sum output of a pair of binary numbers in two operating cycles as shown by the timing diagram in FIG. 2*b*. The detailed circuits shown in FIGS. 15*a* and 15*b* comprise the decimal unit and the carry incorporation circuits (CIC #1) for stage #1. The binary partial adder circuits for stage #1, as shown in FIG. 15*a*, and the binary carry detector circuit as shown in FIG. 15*b* are typical of corresponding circuits of all binary adder stages (e.g., twelve stages). As noted generally before, the carry propagation circuit CPC #1) for stage #1 of the binary adder is the same as the carry propagation circuit (CPC #1) for the decimal adder 20, as illustrated in FIG. 11*a*; and the carry propagation circuits (CPC #2–#12) for the remaining stages #2 to #12 are shown in FIGS. 11*a* and 11*b*. The carry incorporation circuit (CIC #10) for the binary adder is shown in FIG. 15*c*. This circuit (CIC #10) is typical of carry incorporation circuits providing for three partial carry signals (e.g., carry signal outputs *ka*, *kb* and *kc*) required for stages #10 to #12. Also, binary carry incorporation circuit (CIC #1), shown in FIG. 15*a*, is typical of carry incorporation circuits having a single carry signal (e.g., carry signal output K1), as shown in FIG. 15*a*. The binary adder provides inputs *a*1, *a*2, *a*4, *a*8, for the set of four lower order bits ($2^0$, $2^1$, $2^2$ and $2^3$) of the augend and *d*1, *d*2, *d*4, *d*8, for the set of four lower order bits ($2^0$, $2^1$, $2^2$ and $2^3$) of the addend. In binary partial adder circuits, 30*a*, 32*a*, 34*a* and 36*a*, shown in FIG. 15*a*, the eight bits including the two sets are combined in the networks of majority elements to produce partial binary sums at outputs S*p*1*a*, S*p*2*a*, S*p*4*a* and S*p*8*a* without regard to carry in or carries between adder stages (as mentioned before, each stage represents four bits). In FIG. 15*b*, which shows the binary carry detector circuit, the eight bits are applied to inputs *a*1, *a*2, *a*4, *d*8 and *d*1, *d*2, *d*4, *d*8 and combined in the network of majority elements, as shown, to produce carry signals indicating a partial sum equal to or greater than 15 (≧15) in stage #1 at outputs R15*a* and equal to or greater than 16 (≧16) at output R16*a*.

The binary partial adder circuit 30*a* (FIG. 15*a*) comprises a network of majority elements P50, P51, P50*a* and P50*b* which sums the binary signals at inputs *a*1 and *d*1 to provide the lowest order "0" or "1" bit of the binary partial sum at the output S*p*1*a*. Majority elements P50, P51 and P50*a* comprise a network providing an exclusive OR logical function which provides a "1" bit output only when a "1" bit is applied to input *a*1 or input *d*1 but not both inputs *a*1 and *d*1. The binary partial adder circuit 32*a* comprises a network of majority elements P52, P53, P54, P52*a* and P52*b* which provides the next to the lowest order bit ($2^1$) of the binary partial sum at the output S*p*2A, as shown. This circuit 32*a* provides a "1" at output S*p*2*a* when there is no binary intra-stage carry ("0" bit on output 54) and a "1" bit is applied exclusively to either inputs *a*2 or *d*2. Also, this circuit 32*a* provides inputs *a*1 and *d*1 to produce a "1" bit at output S*p*2*a* when a "1" bit is applied to each of the inputs *a*1 and *d*1 and a "0" bit is applied to both of the inputs *a*2 and *d*2 or a "1" bit is applied to both of the inputs *a*2 and *d*2. Also, majority element P54 has output 54 which is coupled to networks of circuits 34*a* and 36*a* to provide binary intra-stage carry signals from partial sum networks for the two lower order bits of the partial sum to partial sum networks for the two higher order bits ($2^2$ and $2^3$) of the partial sum.

The binary partial adder circuits providing partial sum outputs S*p*4*a* and S*p*8*a* include majority elements P55, P56, P58 and P59 for delaying (storing) binary signals at inputs *a*4, *d*4, *a*8 and *d*8 during subclock I of cycle No. 1 (FIG. 2*b*) in order to provide for inclusion of the binary intra-stage carry signal at output 54 which carry signal was produced during subclock I and available during subclock II of cycle No. 1. In the circuit 34*a* (FIG. 15*a*), the network of majority elements P55*a*, P56*a*, P56*a'* and P55*b* provides a "1" bit at partial sum output S*p*4*a* when a "1" bit is applied exclusively to either input *a*4 or *d*4 and there is no binary intra-stage carry signal ("0" bit on output 54). When a "1" bit is present on output 54, a "1" bit is produced at output S*p*4*a* only when a "1" bit is applied to both or neither of the inputs *a*4 and *d*4. As to partial adder circuit 36*a*, this network including majority elements P58*a*· P58*a'*, P59*a* and P58*b* is similar to the network of circuit 34*a*. In the circuit 36*a*, majority elements P58*a* and P58*a'* have the equivalent of seven control inputs to provide for the five outputs of the majority elements P55, P56, P58, P59 and binary intra-stage carry output 54. Thus, the highest order partial sum bit ($2^3$) is provided at output S*p*8*a* in response to the two highest order bits at inputs *a*8 and *d*8 and signals from the six lower order bits. From the foregoing, it is seen that a four bit partial sum is provided by binary partial adder circuits 30*a*, 32*a*, 34*a* and 36*a* at outputs S*p*1*a*, S*p*2*a*, S*p*4*a* and S*p*8*a*, respectively. These outputs are coupled to respective outputs of the binary carry incorporation circuit (CIC #1) wherein the carry signal produced by carry propagation circuit (CPC #1) at output K1 is combined with the partial sum to produce the binary sum S1 at sum outputs S1*a*, S2*a*, S4*a* and S8*a*.

Before discussing the operation of the binary incorporation circuits in detail, the operation of the binary carry detector circuit 38*a* for adder stage #1 shown in FIG. 15*b* will be considered. As shown, control inputs *a*1, *a*2, *a*4, *a*8 and *d*1, *d*2, *d*4 and *d*8 are provided for the eight bits of the augend and addend. These inputs are coupled to majority elements P50, P*r*51, P*r*52 and P51 having outputs coupled to majority elements P*r*51*a* and P*r*52*a*, as shown in FIG. 15*b*, to provide carry signals at outputs R15*a* and R16*a*. A "1" bit carry signal at each of the outputs R15*a* indicates a partial sum in adder stage #1 equal to or greater than fifteen (≧15) in adder stage #1 and a "1" bit at each of the outputs R16*a* indicates a partial sum equal to or greater than sixteen (≧16) in stage #1.

The outputs R15*a* and R16*a* of stage #1 binary carry detector circuit 38*a* are coupled to carry propagation circuits (CPC #1–#2, FIG. 11a). Thus, outputs R15a and R16a are substituted for outputs R9a and R10a to provide the control inputs for majority elements Pc2 and Pc3 of carry propagation circuits (CPC #1–#2), respectively. Also, the outputs of binary carry detection circuits for the stages #1 of the binary adder and stages #2 to #12 (not shown) are substituted for the carry detector circuit outputs of the decimal adder 20 to provide the carry signals at outputs K2 to K9 and ka (FIG. 11a) and the partial carry signals at outputs kb to kj (FIG. 11b).

Referring again to FIG. 15a for a description of the operation of the carry incorporation circuit (CIC #1), the partial sums provided at outputs Sp1a, Sp2a, Sp4a and Sp8a are combined with carry signals on output K1 of the carry propagation circuit CPC #1 (FIG. 11a). The partial sum outputs Sp1a, Sp2a, Sp4a and Sp8a are coupled to majority elements operative during subclock I of cycle No. 2, as shown in FIG. 15a. The output Sp1a is coupled to majority element Ps1 to store (delay) the signal in order to be available at subclock II of cycle No. 2 to be combined with the carry signal output K1 in majority elements Ps1a and Ps1a′. The latter majority elements Ps1a, Ps1a′ and element Ps1b form a network to provide an exclusive OR logical operator for the partial sum signal at the outputs of majority element Ps1 and the carry signal at output K1 to provide the sum signal at sum output S1a. In order to provide an intra-stage carry to networks of majority elements for higher order outputs S2a, S4a and S8a, the partial sum output Sp1a is also coupled to two of three majority elements of each of the higher order networks having outputs S2a, S4a and S8a, respectively. Similarly, outputs Sp2a and Sp4a are coupled directly to two of the three majority elements of the networks for higher order sum outputs, respectively, of carry incorporation circuit (CIC #1) of stage #1. Also, as shown in FIG. 15a, outputs Sp2a, Sp4a and Sp8a are coupled directly to all three majority elements of their respective networks. Therefore, output Sp2a is coupled to majority element Ps2 and to majority elements Ps2′ and Ps2″ along with output Sp1a.

It is seen that the mutually exclusive operation of the binary carry incorporation circuit (CIC #1, FIG. 15a) is similar to carry incorporation circuit (CIC #1, FIG. 12) which has been described, supra. Thus, for example, when a "1" bit on carry signal output K1 is applied to the network having sum output S2a, a "1" bit is produced at the output S2a only when a "1" bit is also provided on either of the outputs Sp2a or Sp1a, but not both. However, when a "0" bit carry signal is present on output K1 and a "1" bit signal is present on output Sp2a, a "1" bit is produced at output S2a. In view of the foregoing description, the operation of the remaining networks of the binary carry incorporation circuit (CIC #1, FIG. 15a) is clear particularly in view of the more detailed description of the similar carry incorporation circuit (CIC #1, FIG. 12).

As to the operation of the binary carry incorporation circuit (CIC #10, FIG. 15c), the networks shown therein are typical of binary carry incorporation circuits having carry signal input terminals 43 for three partial carry signal outputs, e.g., ka, kb and kc, instead of the single carry signal output. This circuit (CIC #10) combines a partial sum provided at outputs Sp1m, Sp2m, Sp4m and Sp8m, and partial carry signals ka, kb and kc to produce the sum S10 at outputs S1m, S2m, S4m and S8m. This binary carry incorporation circuit (CIC #10, FIG. 15c) is very similar to the decimal carry incorporation circuit (CIC #1, FIG. 15a) and (CIC #10, FIG. 13a). In view thereof, the operation of the carry incorporation circuit (CIC #10) should be apparent from the detailed showing in FIG. 15c.

In the light of the above teachings, various modifications and variations of the present invention are contemplated and will be apparent to those skilled in the art without departing from the spirit and scope of the invention.

What is claimed is:

1. A parallel decimal adder circuit arrangement having a plurality of adder stages for summing a pair of numbers whose digits are represented by respective sets of binary-coded decimal signals, each stage comprising: partial adder circuit means responsive to sets of said binary-coded decimal signals for producing binary-coded decimal signals representing their partial sum (mod 10); carry generating circuit means responsive to said sets of binary-coded decimal signals and carry digit signals of lower order stages for producing a carry digit signal for the next higher order stage; and carry incorporation circuit means responsive to the binary-coded decimal signals representing the partial sum (mod 10) for the respective stage and the carry digit signal from the next lower order stage for producing binary-coded decimal signals representing the sum of said sets of binary-coded decimal signals.

2. A parallel decimal adder circuit arrangement having a plurality of adder stages for summing a pair of plural-digit numbers whose digits are represented by respective sets of binary-coded decimal signals, each stage comprising: partial adder circuit means responsive to corresponding decimal order sets of said binary-coded decimal signals for producing a set of binary-coded decimal signals representing their partial sum (mod 10); carry detection circuit means responsive to said corresponding decimal order sets of binary-coded decimal signals for producing carry information signals indicating whether the sum of these signals is not less than nine ($\geqq 9$) and/or not less than ten($\geqq 10$); carry propagation circuit means responsive to carry information signals produced for the respective stage and carry information signals of lower order stages for producing a carry signal for the next higher order stage; and carry incorporation circuit means responsive to the partial sum (mod 10) signals produced by the partial adder circuits of the respective stage and the carry signal produced by the carry propagation circuit means of the next lower order stage for producing binary-coded decimal signals representing the sum of said corresponding decimal order sets of binary-coded decimal signals.

3. A parallel decimal adder circuit arrangement having a plurality of adder stages for summing a pair of plural-digit numbers whose digits are represented by a set of binary-coded decimal signals, each stage comprising: partial adder circuit means responsive to corresponding sets of said binary-coded decimal signals for producing a set of binary-coded decimal signals representing their partial sum (mod 10); carry detection circuit means responsive to said corresponding sets of binary-coded decimal signals for producing carry information signals indicative of lower order stage carry output propagation signals and/or carry originating output signals for the stage; carry propagation circuit means responsive to carry information signals produced by the carry detection circuit means for the respective stage and lower order stages for producing a carry signal for the next higher order stage; and carry incorporation circuit means responsive to the partial sum (mod 10) signals produced by the partial adder circuits of the respective stage and the carry signal produced by the carry propagation circuit means of the next lower order stage for producing binary-coded decimal signals representing the sum of said corresponding sets of binary-coded decimal signals.

4. A parallel decimal adder circuit arrangement having a plurality of adder stages for summing a pair of plural-digit numbers whose digits are represented by respective sets of binary-coded decimal signals, comprising: partial adder circuit means for each stage responsive to corresponding sets of said binary-coded decimal signals for concurrently producing corresponding sets of binary-coded decimal signals representing their partial sums (mod 10); carry detection circuit means for each stage responsive to said corresponding sets of binary-coded decimal signals for detecting whether their sum is not less than nine (≧9) and/or not less than ten (≧10) for producing carry information signals indicative of lower order stage carry output propagation signals and/or carry output signals for each respective stage; carry propagation circuit means for each stage responsive to carry information signals produced for the respective stage and carry information signals of lower order stages for producing carry output signals for the next higher order stages; and carry incorporation means for each stage responsive to binary-coded decimal signals representing the partial sum (mod 10) produced by the partial adder circuits for the respective stages and carry output signals produced by the carry propagation circuit for the next lower order stage for producing binary-coded decimal signals representing the sum of said corresponding sets of binary-coded decimal signals.

5. A parallel decimal adder circuit arrangement having a plurality of adder stages for summing a pair of plural-digit numbers whose digits are represented by respective sets of four binary signals, each stage comprising: four partial adder circuit means responsive to incoming sets of said four binary signals for producing a set of four binary signals representing their partial sum (mod 10); carry detection circuit means responsive to said incoming sets of four binary signals for producing carry information signals indicating whether the sum of these signals is not less than nine (≧9) and/or not less than ten (≧10); carry propagation circuit means responsive to carry information signals produced for the respective stage and carry signals of lower order stages for producing a carry signal for the next higher order stage; and carry incorporation circuit means responsive to the partial sum (mod 10) signals produced by the partial adder circuits of the respective stage and the carry signal produced by the carry propagation circuit means of the next lower order stage for producing an outgoing set of four binary signals representing the sum of said incoming sets of four binary signals.

6. A parallel decimal adder circuit arrangement for producing the sum of two groups of decimal digits represented by a plurality of first and second sets of four binary-coded decimal digit signals for each pair of digits of the same order comprising: a plurality of parallel adder stages, each of said stages including four partial adder circuits operating in parallel for providing binary-coded decimal signals representing the partial sum (mod 10) of one of said pair of digits, a plurality of said partial adder circuits including networks of interconnected majority logic computer elements having an output and a plurality of inputs for receiving respective first and second sets of four binary signals for decimal digits of the same decimal order for providing respective binary-coded decimal digit signals of said partial sum (mod 10) at the respective outputs; a carry information signal circuit for each stage including a network of majority logic computer elements having a plurality of inputs for respective first and second sets of four binary-coded decimal signals of the same decimal order for detection of sums in the respective stage which are equal to or greater than nine (≧9) and equal to or greater than ten (≧10) and a pair of outputs to provide respective first and second binary carry information signals indicating the sum to be equal to or greater than nine (≧9) and equal to or greater than ten (≧10), respectively; a carry propagation circuit for each adder stage for producing carry digit signals for incorporation in the sum of the next higher order stage sum output and propagating carry signals to higher order stages, each of said propagation circuits comprising a network of majority logic computer elements coupled to the outputs of the carry detector circuits of the respective adder stage and any next lower adder stages to produce a carry digit signal in response to both said first and second carry information signals of the respective stage or in response to at least said first carry information signal of the respective stage and carry information signals producing a carry digit signal in any next lower stage; and a carry incorporation circuit for each adder stage, each of said carry incorporation circuits comprising a network of majority logic computer elements having inputs coupled to the outputs of the partial adder circuits of the respective adder stage for combining the partial sum signals of the respective adder stage and the carry digit signals produced by the carry propagation circuit of any next lower stage to produce a set of four binary signals representing the binary-coded decimal sum of said first and second sets of binary signals of the same decimal order whereby the sum of the two groups of decimal digits is produced by the plurality of adder stages.

7. In a decimal adder, circuit means including networks of majority logic elements for providing the partial sum of two decimal digits represented by two sets of binary-coded decimal signals in an operating cycle comprising: a source of timing signals having a plurality of timing signal outputs for producing high frequency timing signals I, II and III sequentially in time during an operating cycle at the respective outputs; a first group of majority elements having outputs and control inputs for receiving predetermined combinations of binary "0" and "1" signals of said two sets of binary-coded decimal signals to produce a binary "0" or "1" signal on each of the respective outputs and timing signal inputs coupled to a first one of said timing signal outputs to be operative during timing signal I; a second group of majority elements having outputs and inputs including control inputs coupled to predetermined outputs of said first group and timing signal inputs coupled to a second one of said timing signal outputs to be operative during timing signal II; and a third group of four majority elements having outputs and inputs including control inputs coupled to predetermined outputs of said second group and timing signal inputs coupled to a third one of said timing signal outputs to be operative during timing signal III; said third group of four majority elements producing binary-coded decimal signals at the respective outputs representing the decimal sum of said two decimal digits.

8. In a parallel decimal adder circuit, circuit means for producing carry signal information comprising: a first plurality of majority decision elements, said elements having a plurality of inputs for receiving predetermined sets of binary-coded decimal signals representing a pair of decimal digits to produce a plurality of concurrent output signals indicating predetermined combinations of binary digits in said sets; and a second plurality of majority decision elements having inputs coupled to predetermined elements of said first plurality of majority elements for combining predetermined combinations of said output signals to produce a first output signal indicating the sum of the pair of digits to be equal to or greater than nine (≧9) and a second output signal indicating the sum of the pair of digits to be equal to or greater than ten (≧10).

9. In a parallel decimal adder, adder circuit means comprising: majority logic computer elements interconnected to provide individual networks for producing logical operations to provide a binary-coded decimal sum of binary-coded decimal digits applied to inputs of said networks; and a plurality of said majority elements each comprising circuit means having a plurality of control inputs and an output and capable of receiving at least seven binary signals to produce a binary "0" or "1" signal output corresponding to the majority of binary signals coupled to said element.

10. In an adder circuit for producing the sum of digits represented by binary "0" and "1" signals, adder circuit means comprising: a plurality of majority logic elements each of said elements having control inputs for receiving binary "0" and "1" signals and capable of producing a binary "0" or "1" signal corresponding to the majority of four binary "0" or "1" signals out of seven of said binary "0" or "1" signals, and circuit means interconnecting groups of said majority elements to form networks for combining said binary signals to produce binary signals representing the sum of said digits.

11. A parallel decimal adder circuit arrangement having a plurality of adder stages for summing a pair of plural-digit numbers whose digits are represented by respective sets of binary-coded decimal signals comprising: a first, second, third and fourth group of majority elements, said majority elements comprising parametric elements including a tuned circuit having inputs and outputs and coupled to a thin film of anisotropic magnetic material exhibiting single domain characteristics; said first group of majority elements interconnected in networks to form partial adder circuits and responsive to corresponding decimal order sets of said binary-coded decimal signals to produce a set of binary-coded decimal signals representing their partial sum (mod 10); said second group of majority elements interconnected in networks to form a carry detector circuit and responsive to corresponding decimal order sets of said binary-coded decimal signals to produce carry information signals including a first binary signal indicating the sum to be equal to or greater than nine ($\geqq 9$) and a second binary signal indicating the sum to be equal to or greater than ten ($\geqq 10$); said third group of majority elements interconnected to form networks responsive to carry information signals produced for the respective stage and carry information signals of lower order stages for producing a carry signal for the next higher order stage; and said fourth group of majority elements interconnected to form networks responsive to the partial sum (mod 10) signals produced by said first group of the first stage and the carry signal produced by the third group of the next lower stage for producing a set of binary-coded decimal signals representing the sum of said corresponding decimal order sets of binary-coded decimal signals.

12. A parallel adder for summing a pair of plural-digit numbers having a radix $n$ (wherein $n$ is equal to either 10 or 2) comprising: a plurality of adder stages each of which corresponds to a respective denomination of the digits of said numbers, each of said adder stages comprising a partial adder circuit for producing an output representing the partial sum (mod $n$) of the corresponding digits of said numbers and carry detection circuit means for producing carry information signals including both an absolute carry signal and a redundant, conditional carry signal when the partial sum is at least equal to $n$ and for producing a conditional carry signal only when the partial sum is at least equal to $(n-1)$; carry propagation circuit means coupled to said carry detection circuit means to be responsive to said carry information signals produced for the respective stage and carry information signals produced for any lower order stages for producing final carry information; and carry incorporation means responsive to the output of the respective partial adder circuit and the final carry information produced for any next lower order stage for producing an output representing the respective digit of the final sum.

13. The parallel adder according to claim 12 in which said carry propagation circuit means comprises majority decision logic elements constructed and arranged to produce said redunant conditional carry signal whenever an absolute carry signal is produced in order to provide redundancy of carry signals coupled to said carry propagation circuit means.

14. A parallel adder according to claim 13 wherein each of said majority decision logic elements is a parametron.

15. A parallel adder according to claim 14 wherein each of said parametrons is capable of providing seven inputs for receiving binary signals "1" and "0" and producing binary output signals "1" and "0" corresponding to the majority of said binary signals applied to said inputs.

16. In a parallel adder circuit for summing a pair of plural digit numbers having a radix $n$ (wherein $n$ is equal to either 10 or 2), circuit means for producing carry signal information comprising: a first plurality of majority decision elements, said elements having a plurality of inputs for receiving predetermined sets of signals representing a pair of digits of radix $n$ to produce a plurality of concurrent output signals indicating predetermined combinations of signals in said sets; and a second plurality of majority decision elements having inputs coupled to predetermined elements of said first plurality of majority elements for combining predetermined combinations of said output signals for producing a first output signal indicating the sum of the pair of digits to be equal to or greater than $(n-1)$ and a second output signal indicating the sum of the pair of digits to be equal to or greater than $n$.

17. Circuit means according to claim 16 which further includes carry propagation circuit means including majority decision elements coupled to said second plurality of majority decision elements for receiving both first and second output signals produced when the sum of the pair of digits is equal to or greater than $n$ to provide final carry information signals including redundant carry information provided by both said first and second output signals.

18. A computer circuit comprising: a plurality of groups of majority logic decision elements interconnected to provide individual networks for performing data processing operations in a plurality of logical levels wherein each group provides one logical level of said operations and said individual networks perform a plurality of said logical levels of operations sequentially in time, means interconnecting predetermined elements of each group to predetermined elements of the next group, operable next in time, to perform said logical levels of operations sequentially in time, each of said majority elements comprising a magnetic thin film parametric element including a tuned circuit having a timing signal input, control inputs, and outputs, and capable of receiving seven binary "0" or "1" signals at said control inputs to produce a binary "0" or "1" signal at said outputs; and a source of timing signals having a plurality of timing signal outputs coupled to timing signal inputs of respective ones of said groups of majority elements for supplying high frequency timing signals I, II, and III sequentially in time during an operation cycle to respective ones of said groups for timing the sequence and performance of logical levels of data processing operations by said individual networks.

References Cited by the Examiner

UNITED STATES PATENTS

| | | | |
|---|---|---|---|
| 3,113,206 | 12/1963 | Harel | 235—176 |
| 3,155,839 | 11/1964 | Modiano | 307—88.5 |

OTHER REFERENCES

Ang: "Parallel BCD Adder," IBM Technical Disclosure Bulletin, vol. 4, No. 2, July 1961 (pp. 41 relied on).

MALCOLM A. MORRISON, *Primary Examiner.*

M. J. SPIVAK, *Assistant Examiner.*